US012530099B2

(12) United States Patent
Kim et al.

(10) Patent No.: US 12,530,099 B2
(45) Date of Patent: Jan. 20, 2026

(54) DISPLAY DEVICE

(71) Applicant: Samsung Display Co., Ltd., Yongin-si (KR)

(72) Inventors: Eunyoung Kim, Yongin-si (KR); Gyeongnam Bang, Yongin-si (KR); Hyeyun Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/586,308

(22) Filed: Feb. 23, 2024

(65) Prior Publication Data

US 2024/0288973 A1     Aug. 29, 2024

(30) Foreign Application Priority Data

Feb. 24, 2023    (KR) ..................... 10-2023-0025326

(51) Int. Cl.
     *G06F 3/044*         (2006.01)
     *G06F 3/041*         (2006.01)
     (Continued)

(52) U.S. Cl.
     CPC .......... *G06F 3/0445* (2019.05); *G06F 3/0412* (2013.01); *G06F 3/0446* (2019.05);
     (Continued)

(58) Field of Classification Search
     CPC .... G06F 3/0445; G06F 3/0446; G06F 3/0412; G06F 2203/0411; H10K 59/40; G09G 3/32; G09G 2320/0686; G09G 2354/00
See application file for complete search history.

(56) References Cited

U.S. PATENT DOCUMENTS 9,508,778 B2    11/2016   Kim et al.
10,840,312 B2   11/2020   Lee et al.
(Continued)

FOREIGN PATENT DOCUMENTS

JP        2018-120397 A     8/2018
KR      10-1786446 B1    10/2017
(Continued)

OTHER PUBLICATIONS

International Search and Examination Report of the International Searching Authority, dated Mar. 19, 2024, corresponding to PCT/KR2023/020423, 10 pages.

*Primary Examiner* — Ariel A Balaoing
(74) *Attorney, Agent, or Firm* — Womble Bond Dickinson (US) LLP

(57) ABSTRACT

A display device includes a display panel including emission regions and a non-emission region adjacent to the emission regions; and an input sensor on the display panel, the input sensor including: a first sensing electrode: a second sensing electrode including a sensing pattern spaced from the first sensing electrode in a plan view; and dummy patterns spaced from the first sensing electrode and the sensing pattern of the second sensing electrode, wherein each of the first sensing electrode and the sensing pattern of the second sensing electrode includes line segments that overlap the non-emission region, the line segments defining opening regions that overlap corresponding emission regions of the emission regions, and wherein at least a portion of the dummy patterns overlaps boundary regions defined by a spacing region between the line segments of the first sensing electrode and the line segments of the sensing pattern.

20 Claims, 16 Drawing Sheets

(51) Int. Cl.
*G09G 3/32* (2016.01)
*H10K 59/40* (2023.01)

(52) U.S. Cl.
CPC .... *H10K 59/40* (2023.02); *G06F 2203/04111* (2013.01); *G09G 3/32* (2013.01); *G09G 2320/0686* (2013.01); *G09G 2354/00* (2013.01)

(56) References Cited

U.S. PATENT DOCUMENTS

| | | |
|---|---|---|
| 11,209,946 B2 | 12/2021 | Noh et al. |
| 11,262,860 B2 | 3/2022 | Jeong et al. |
| 2014/0160374 A1* | 6/2014 | Wang ............... G06F 3/0446 427/79 |
| 2015/0062457 A1* | 3/2015 | Kida ............... G06F 3/0446 349/12 |
| 2017/0212629 A1* | 7/2017 | Cho ............... G06F 3/0443 |
| 2018/0348937 A1* | 12/2018 | Pak ............... G06F 3/0446 |
| 2020/0089350 A1* | 3/2020 | Han ............... G06F 3/0446 |
| 2020/0110499 A1* | 4/2020 | Lee ............... G06F 3/0412 |
| 2021/0048925 A1* | 2/2021 | Wang ............... G06F 3/0446 |
| 2021/0200365 A1* | 7/2021 | Lee ............... H10K 59/38 |
| 2021/0223914 A1* | 7/2021 | Noh ............... G06F 3/0445 |
| 2021/0367000 A1* | 11/2021 | Kim ............... G06F 3/04164 |
| 2021/0382580 A1* | 12/2021 | Lee ............... G06F 3/0448 |
| 2022/0392978 A1 | 12/2022 | Bae et al. |
| 2025/0053267 A1* | 2/2025 | Jeong ............... G06F 3/0412 |

FOREIGN PATENT DOCUMENTS

| | | |
|---|---|---|
| KR | 10-2019-0119698 A | 10/2019 |
| KR | 10-2225528 B1 | 3/2021 |
| KR | 10-2408907 B1 | 6/2022 |
| KR | 10-2022-0164844 A | 12/2022 |

* cited by examiner

DISPLAY DEVICE

CROSS-REFERENCE TO RELATED APPLICATION

This application claims priority to and the benefit of Korean Patent Application No. 10-2023-0025326 filed on Feb. 24, 2023 in the Korean Intellectual Property Office, the disclosure of which is hereby incorporated by reference in its entirety.

BACKGROUND

1. Field

The present invention relates to a display device, and more particularly, to a display device including an input sensor.

2. Description of the Related Art

There have been developed a variety of display devices used for multimedia apparatuses such as televisions, mobile phones, tablet computers, navigation systems, and game consoles. A keyboard or a mouse may be included as an input device for the display device. In addition, the display device may be provided with an input sensor as the input device.

SUMMARY

Aspects of embodiments of the present invention are directed to a display device including an input sensor with reduced visibility.

According to some embodiments of the present invention, there is provided a display device including: a display panel including a plurality of emission regions and a non-emission region adjacent to the plurality of emission regions; and an input sensor on the display panel, the input sensor including: an insulation layer; a first sensing electrode: a second sensing electrode including a sensing pattern spaced from the first sensing electrode in a plan view; and a plurality of dummy patterns spaced from the first sensing electrode and the sensing pattern of the second sensing electrode, wherein the insulation layer is between the first sensing electrode and the plurality of dummy patterns and is between the second sensing electrode and the plurality of dummy patterns, wherein each of the first sensing electrode and the sensing pattern of the second sensing electrode includes a plurality of line segments that overlap the non-emission region, the line segments defining a plurality of opening regions that overlap corresponding emission regions of the plurality of emission regions, and wherein at least a portion of the dummy patterns overlaps boundary regions defined by a spacing region between the line segments of the first sensing electrode and the line segments of the sensing pattern of the second sensing electrode.

In some embodiments, the line segments of the first sensing electrode and the line segments of the sensing pattern of the second sensing electrode define a plurality of cut regions, and each of the dummy patterns overlaps a corresponding one of the cut regions and the boundary regions.

In some embodiments, the emission regions include: a plurality of first emission regions configured to emit light of a first color; a plurality of second emission regions configured to emit light of a second color; and a plurality of third emission regions configured to emit light of a third color, wherein two first emission regions of the first emission regions, two second emission regions of the second emission regions, and two third emission regions of the third emission regions define a unit emission region, and wherein the unit emission region includes: a first unit emission region where one of the two first emission regions and one of the two second emission regions are on one side of one of the two third emission regions, and where the third emission region is positioned downwardly with respect to the one of the two first emission regions and the one of the two second emission regions in a direction along which the two first emission regions and the two second emission regions are arranged; and a second unit emission region where another of the two first emission regions and another of the two second emission regions are on one side of another of the two third emission regions, and where the another of the two third emission regions is positioned upwardly with respect to the another of the two first emission regions and the another of the two second emission regions in the direction along which the two first emission regions and the two second emission regions are arranged.

In some embodiments, the plurality of opening regions include: a first opening region corresponding to one of the first emission regions; a second opening region corresponding to one of the second emission regions; and a third opening region corresponding in common to the one of the two third emission regions of the first unit emission region and the another of the two third emission regions of the second unit emission region, the two third emission regions being adjacent to each other in the direction along which the two first emission regions and the two second emission regions are arranged.

In some embodiments, one of the boundary regions is between the one of the two first emission regions and the one of the two second emission regions, another of the boundary regions is between the one of the two first emission regions and the one of the two third emission regions, and still another of the boundary regions is between the one of the two second emission regions and the one of the two third emission regions.

In some embodiments, one of the cut regions is between the one of the two first emission regions and the one of the two second emission regions, another of the cut regions is between the one of the two first emission regions and the one of the two third emission regions, and still another of the cut regions is between the one of the two second emission regions and the one of the two third emission regions.

In some embodiments, the first emission regions, the second emission regions, and the third emission regions define a plurality of unit emission regions including the unit emission region, wherein the plurality of unit emission regions define a pixel matrix that includes an $(m-1)^{th}$ pixel row, an $m^{th}$ pixel row, an $(m+1)^{th}$ pixel row, an $(n-1)$th pixel column, an $n^{th}$ pixel column, and an $(n+1)^{th}$ pixel column, where each of m and n is a natural number equal to or greater than 2, wherein the first unit emission region is on each of an intersection between the $(m-1)^{th}$ pixel row and the $(n-1)$th pixel column, an intersection between the $(m+1)^{th}$ pixel row and the $(n-1)$th pixel column, an intersection between the $m^{th}$ pixel row and the $n^{th}$ pixel column, an intersection between the $(m-1)^{th}$ pixel row and the $(n+1)^{th}$ pixel column, and an intersection between the $(m+1)^{th}$ pixel row and the $(n+1)^{th}$ pixel column, and wherein the second unit emission region is on each of an intersection between the $m^{th}$ pixel row and the $(n-1)$th pixel column, an intersection between the $(m-1)^{th}$ pixel row and the $n^{th}$ pixel column, an intersection between the $(m+1)^{th}$ pixel row and the $n^{th}$ pixel column, and an intersection between the $(n+1)^{th}$ pixel row and the $(n+1)^{th}$ pixel column.

In some embodiments, the line segments include: a first line segment extending in a first direction; and a second line segment extending in a second direction intersecting the first direction, wherein the cut regions define a plurality of cut units each of which include first to eighth cut regions, wherein the first cut region is defined on the first line segment between the first and second emission regions of the second unit emission region at the intersection between the $(m-1)^{th}$ pixel row and the $n^{th}$ pixel column, wherein the second cut region is defined on the second line segment between the second and third emission regions of the second unit emission region at the intersection between the (m−1)th pixel row and the $n^{th}$ pixel column, wherein the third cut region is defined on the first line segment between the second and third emission regions of the first unit emission region at the intersection between the $m^{th}$ pixel row and the $n^{th}$ pixel column, and wherein the fourth cut region is defined on the second line segment between the third emission region of the second unit emission region at the intersection between the $m^{th}$ pixel row and the (n−1)th pixel column and the second emission region of the first unit emission region at the intersection between the $m^{th}$ pixel row and the $n^{th}$ pixel column.

In some embodiments, the fifth cut region is defined on the second line segment between the second and third emission regions of the first unit emission region at the intersection between the (m−1)th pixel row and the (n+1)th pixel column, wherein the sixth cut region is defined on the first line segment between the second emission region of the first unit emission region at the intersection between the $(m-1)^{th}$ pixel row and the (n+1)th pixel column and the first emission region of the second unit emission region at the intersection between the $m^{th}$ pixel row and the (n+1)th pixel column, wherein the seventh cut region is defined on the second line segment between the third emission region of the first unit emission region at the intersection between the $m^{th}$ pixel row and the $n^{th}$ pixel column and the second emission region of the second unit emission region at the intersection between the $m^{th}$ pixel row and the (n+1)th pixel column, and wherein the eighth cut region is defined on the first line segment between the one of the two second emission regions of the second unit emission region at the intersection between the $m^{th}$ pixel row and the (n+1)th pixel column and the one of the two first emission regions of the first unit emission region at the intersection between the $(m+1)^{th}$ pixel row and the (n+1)th pixel column.

In some embodiments, the line segments include: a first line segment extending in a first direction; and a second line segment extending in a second direction intersecting the first direction, wherein the cut regions define a plurality of cut units each of which includes first to eighth cut regions, wherein the first to eighth cut regions are divided into four pairs, each of which includes two cut regions that are closest to each other among the first to eighth cut regions, wherein one of the two cut regions of each of the four pairs is defined on the first line segment, and wherein an other of the two cut regions of each of the four pairs is defined on the second line segment.

In some embodiments, the line segments and the dummy patterns have a same stacked structure.

In some embodiments, the line segments and the dummy patterns include a first conductive layer and a second conductive layer on the first conductive layer, and the first conductive layer has an electrical conductivity and a reflectance greater than an electrical conductivity and a reflectance of the second conductive layer.

In some embodiments, the second sensing electrode includes a plurality of sensing patterns including the sensing pattern, plurality of sensing patterns are arranged along a first direction, the second sensing electrode includes bridge patterns each of which connects two neighboring sensing patterns of the plurality of sensing patterns, and the bridge patterns and the dummy patterns are on the same layer.

In some embodiments, the bridge patterns and the dummy patterns include the same stacked structure.

In some embodiments, the first sensing electrode extends in a second direction and has a single unitary shape, the second direction intersecting the first direction.

According to some embodiments of the present invention, there is provided a display device including: a display panel that includes a plurality of emission regions and a non-emission region adjacent to the plurality of emission regions; and an input sensor on the display panel, the input sensor including: an insulation layer; a sensing electrode; and a plurality of dummy patterns between the sensing electrode and the insulation layer, wherein the sensing electrode includes a plurality of line segments that overlap the non-emission region, the line segments defining a plurality of opening regions that overlap corresponding emission regions of the plurality of emission regions, wherein a plurality of cut regions are defined on the line segments, and wherein the dummy patterns overlap the cut regions.

In some embodiments, the line segments include: a first line segment extending in a first direction; and a second line segment extending in a second direction intersecting the first direction, wherein the cut regions are divided into a plurality of cut region pairs each including two cut regions that are most adjacent to each other, wherein one of the two cut regions of each of the plurality of cut region pairs is defined on the first line segment, and wherein an other of the two cut regions of each of the plurality of cut region pairs is defined on the second line segment.

In some embodiments, the line segments and the dummy patterns include a first conductive layer and a second conductive layer on the first conductive layer, and the first conductive layer has an electrical conductivity and a reflectance greater than an electrical conductivity and a reflectance of the second conductive layer.

In some embodiments, the line segments and the dummy patterns have substantially the same reflectance.

In some embodiments, the line segments and the dummy patterns include substantially the same material.

BRIEF DESCRIPTION OF DRAWINGS

The above and other aspects, features, and advantages of certain embodiments of the disclosure will be more apparent from the following description taken in conjunction with the accompanying drawings.

DETAILED DESCRIPTION

Figure 1:
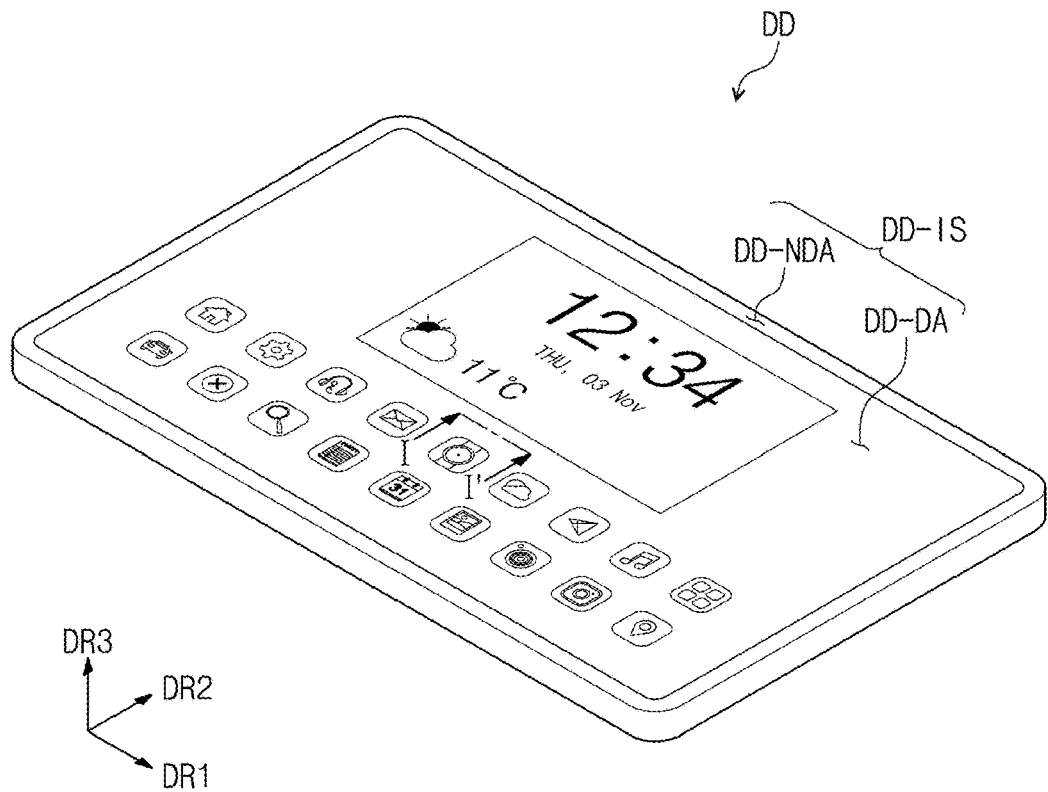
FIG. 1 is a perspective view showing a display device according to some example embodiments of the present invention.

The attached drawings for illustrating exemplary embodiments of the inventive concept are referred to in order to gain a sufficient understanding of the inventive concept, the merits thereof, and the objectives accomplished by the implementation of the inventive concept. The inventive concept may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art.

Hereinafter, the present invention will be described in detail by explaining exemplary embodiments of the inventive concept with reference to the attached drawings. Like reference numerals in the drawings denote like elements, and their descriptions may not be provided. Sizes of components in the drawings may be exaggerated for convenience of explanation. In other words, because sizes and thicknesses of components in the drawings are arbitrarily illustrated for convenience of explanation, the following exemplary embodiments are not limited thereto.

Unless otherwise defined, all terms used herein including technical and scientific terms have the same meaning generally understood by one of ordinary skill in the art. Also, terms as defined in dictionaries generally used should be understood as having meaning identical or meaning contextually defined in the art and should not be understood as ideally or excessively formal meaning unless definitely defined herein.

The following will now describe some embodiments of the present invention in conjunction with the accompanying drawings.

FIG. 1 is a perspective view showing a display device DD according to some embodiments of the present invention. As shown in FIG. 1, the display device DD may display an image on a display surface DD-IS. The display surface DD-IS may be parallel to a plane defined by a first directional axis DR1 and a second directional axis DR2. A third directional axis DR3 may indicate a normal direction with respect to the display surface DD-IS, or a thickness direction of the display device DD.

The third directional axis DR3 may differentiate a front surface (or top surface) and a rear surface (or bottom surface) of each member or unit which will be discussed below. However, the first, second, and third directional axes DR1, DR2, and DR3 are merely illustratively shown in the present embodiment. In the following description, first, second, and third directions are directions indicated by the first, second, and third directional axes DR1, DR2, and DR3 and are allocated the same reference symbols.

In some embodiments of the present invention, the display device DD is illustrated to have a flat display surface, but the present invention is not limited thereto. The display device DD may include a curved display surface or a cubic display surface. The cubic display surface may include a plurality of display regions, such as a bent display surface, that denote different directions from each other. A flexible display device may be adopted as the display device DD. The flexible display device DD may be a foldable display device capable of being folded.

The present embodiments depict by way of example the display device DD that can be applicable to a tablet terminal. The tablet terminal may be configured to include the display device DD in a bracket/casing that accommodates a main board on which are installed electronic modules, a camera module, a power module, and the like. The display device DD according to the present invention may be applicable not only to large-sized electronic apparatuses such as television sets and monitors, but to small and medium-sized electronic apparatuses such as mobile phones, automotive navigation systems, game consoles, and smart watches.

As shown in FIG. 1, the display surface DD-IS may include an image region DD-DA that displays an image and a bezel region DD-NDA adjacent to (e.g., surrounding) the image region DD-DA. The bezel region DD-NDA may be a region on which no image is displayed. FIG. 1 depicts images of icons as an example of the image.

The image region DD-DA may have a substantially tetragonal shape as illustrated in FIG. 1. The expression "a substantially tetragonal shape" may include not only a tetragonal shape in the mathematical sense, but a tetragonal shape whose edges (or corners) are defined without a vertex but with a curved boundary, for example.

The bezel region DD-NDA may surround the image region DD-DA. The present invention, however, is not limited thereto, and the bezel region DD-NDA may be changed in shape. For example, the bezel region DD-NDA may be disposed on only one side of the image region DD-DA.

Figure 2:
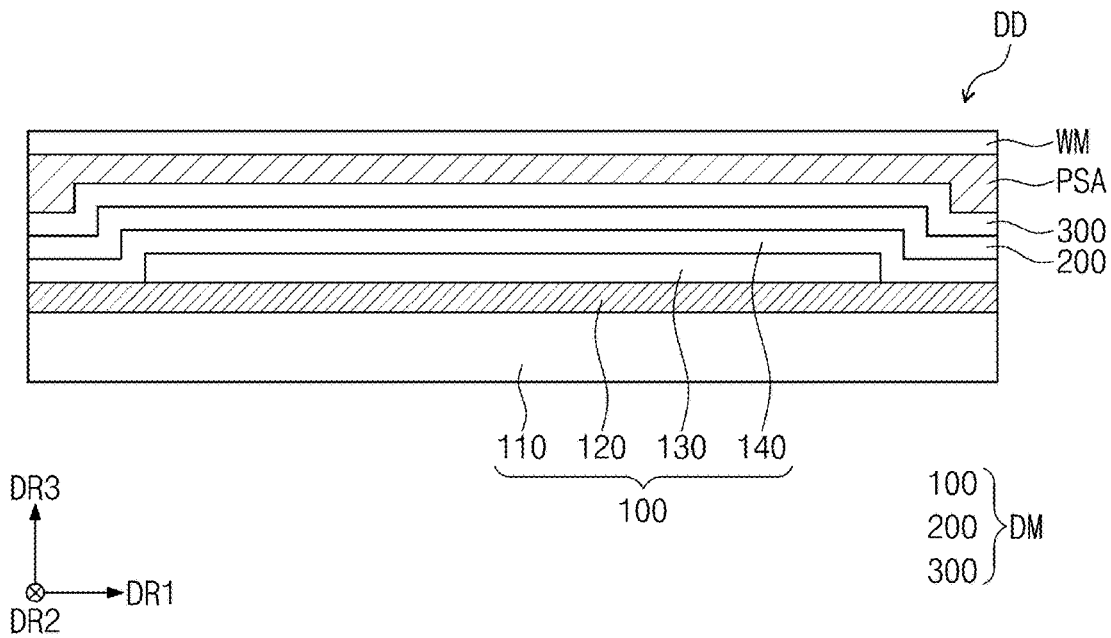
FIG. 2 is a cross-sectional view showing a display device according to some embodiments of the present invention.

FIG. 2 is a cross-sectional view showing the display device DD according to some embodiments of the present invention.

The display device DD may include a display module DM and a window WM disposed on the display module DM. The display module DM and the window WM may be combined through an adhesion layer PSA. According to some embodiments of the present invention, the window WM is formed by a coating method, and is in contact with the display module DM without the adhesion layer PSA.

The display module DM may include a display panel 100, an input sensor 200, and an antireflection layer 300. The display panel 100 may include a base layer 110, a driving element layer 120, an emission element layer 130, and an encapsulation layer 140.

The driving element layer 120 may be disposed on a top surface of the base layer 110. The base layer 110 may be a flexible substrate that can be bendable, foldable, and/or rollable. The base layer 110 may be a glass substrate, a metal substrate, or a polymer substrate. The present invention, however, is not limited thereto, and the base layer 110 may be an inorganic layer, an organic layer, or a composite material layer. Substantially, the base layer 110 may have the same shape as that of the display panel 100.

The base layer 110 may have a multi-layered structure. For example, the base layer 110 may include a first synthetic resin layer, a second synthetic resin layer, and inorganic layers disposed between the first and second synthetic resin layers. Each of the first and second synthetic resin layers may include a polyimide-based resin, but the present invention is not particularly limited thereto.

The driving element layer 120 may be disposed on the base layer 110. The driving element layer 120 may include a plurality of insulation layers, a plurality of semiconductor patterns, a plurality of conductive patterns, and a plurality of signal lines. The driving element layer 120 may include a pixel driver circuit.

The emission element layer 130 may be disposed on the driving element layer 120. The emission element layer 130 may include a light-emitting element (e.g., a light-emitting diode (LED)). For example, the light-emitting element may include an organic light-emitting material, an inorganic light-emitting material, an organic-inorganic light-emitting material, a quantum dot, a quantum rod, a micro-LED, or a nano-LED.

The encapsulation layer 140 may be disposed on the emission element layer 130. The encapsulation layer 140 may protect the emission element layer 130 or the light-emitting element against moisture, oxygen, and foreign substances such as dust particles. The encapsulation layer 140 may include at least one encapsulation inorganic layer. The encapsulation layer 140 may have a stacked structure of a first encapsulation inorganic layer, an encapsulation organic layer, and a second encapsulation inorganic layer.

The input sensor 200 may be directly disposed on the display panel 100. The input sensor 200 may detect user's inputs by using, for example, an electromagnetic induction method and/or a capacitance method. The display panel 100 and the input sensor 200 may be formed by a series of processes. In this description, the phrase "directly disposed" may mean that no third component (e.g., no intervening layer) is disposed between the input sensor 200 and the display panel 100. For example, no adhesion layer may be separately disposed between the input sensor 200 and the display panel 100.

The antireflection layer 300 may reduce a reflectance of external light that is incident from outside the window WM. In some embodiments of the present invention, the antireflection layer 300 may include a retarder and a polarizer. The retarder may be of a film type or a liquid crystal coating type, and may include a $\lambda/2$ retarder and/or a $\lambda/4$ retarder. The polarizer may also be of a film type or a liquid crystal coating type. The film type may include a stretchable synthetic resin film, and the liquid crystal coating type may include arrayed liquid crystals. The retarder and the polarizer may further include their protection film. Either the retarder and the polarizer or the protection film may be defined as a base layer for the antireflection layer 300.

In some embodiments of the present invention, the antireflection layer 300 includes color filters. The color filters may be arranged in a certain fashion. The arrangement of the color filters may be determined in consideration of colors of light emitted from pixels included in the display panel 100. The antireflection layer 300 may further include a black matrix adjacent to the color filters. The antireflection layer 300 including the color filters may be directly disposed on the display panel 100.

In some embodiments of the present invention, the window WM may include a base layer and a light-shield pattern. The base layer may include a glass substrate and/or a synthetic resin film. The light-shield pattern may partially overlap the base layer. The light-shield pattern may be disposed on a bottom surface of the base layer, and may substantially define the bezel region (see, e.g., DD-NDA of FIG. 1) of the display device DD. A region where no light-shield pattern is disposed may be defined as the image region (see, e.g., DD-DA of FIG. 1) of the display device DD.

Figure 3:
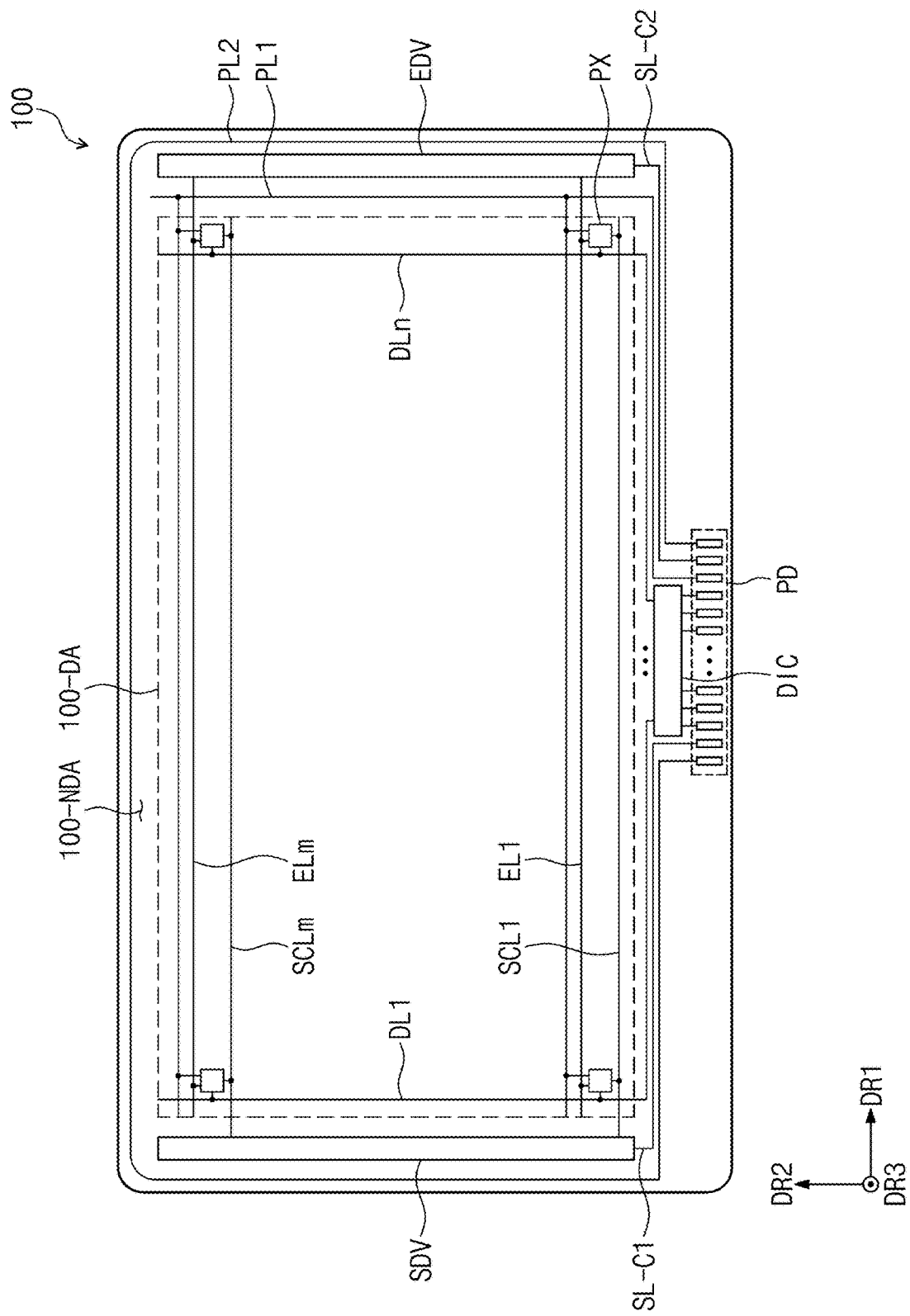
FIG. 3 is a plan view showing a display panel according to some embodiments of the present invention.

FIG. 3 is a plan view showing the display panel 100 according to some embodiments of the present invention.

Referring to FIG. 3, the display panel 100 may include a plurality of pixels PX, a scan driver circuit SDV, an emission driver circuit EDV, a plurality of signal lines, and a plurality of pads PD. The plurality of pixels PX may be disposed on a display region 100-DA. A data driver circuit may be included in a driver chip DIC mounted on a non-display region 100-NDA. The display region 100-DA may correspond to the image region DD-DA of FIG. 1, and the non-display region 100-NDA may correspond to the bezel region DD-NDA. In this description, the phrase "a region or portion corresponds to a region or portion" may mean that a region or portion overlaps a region or portion, without being necessarily limited to that two different regions or portions have the same area. In some embodiments of the present invention, likewise the scan driver circuit SDV and the emission driver circuit EDV, the data driver circuit may also be integrated on the display panel 100.

The plurality of signal lines may include a plurality of scan lines SL1 to SLm, a plurality of data lines DL1 to DLn, a plurality of emission lines EL1 to ELm, first and second control lines SL-C1 and SL-C2, and first and second power lines PL1 and PL2. Here, the subscripts "m" and "n" are natural numbers equal to or greater than 2.

The scan lines SL1 to SLm may extend in the first direction DR1 to electrically connect with the pixels PX and the scan driver circuit SDV. The data lines DL1 to DLn may extend in the second direction DR2 to electrically connect with the pixels PX and the driver chip DIC. The emission lines EL1 to ELm may extend in the first direction DR1 to electrically connect with the pixels PX and the emission driver circuit EDV.

The first power line PL1 may receive a first power voltage, and the second power line PL2 may receive a second power voltage whose level is less than that of the first power voltage. A second electrode (or a cathode) of the light-emitting element may be connected to the second power line PL2.

The first control line SL-C1 may be connected to the scan driver circuit SDV and may extend toward a lower end of the display panel 100. The second control line SL-C2 may be connected to the emission driver circuit EDV and may extend toward the lower end of the display panel 100. The pads PD may be disposed on the non-display region 100-NDA adjacent to the lower end of the display panel 100, and may be closer than the driver chip DIC to the lower end of the display panel 100. The pads PD may be connected to the driver chip DIC and some signal lines.

The scan driver circuit SDV may generate a plurality of scan signals, and the scan signals may be applied through the scan lines SL1 to SLm to the pixels PX. The driver chip DIC may generate a plurality of data voltages, and the data voltages may be applied through the data lines DL1 to DLn to the pixels PX. The emission driver circuit EDV may generate a plurality of emission signals, and the emission signals may be applied through the emission lines EL1 to ELm to the pixels PX. In response to the scan signals, the pixels PX may be provided with the data voltages. In response to the emission signals, the pixels PX may emit light whose brightness corresponds to the data voltages, thereby displaying an image.

Figure 4A:
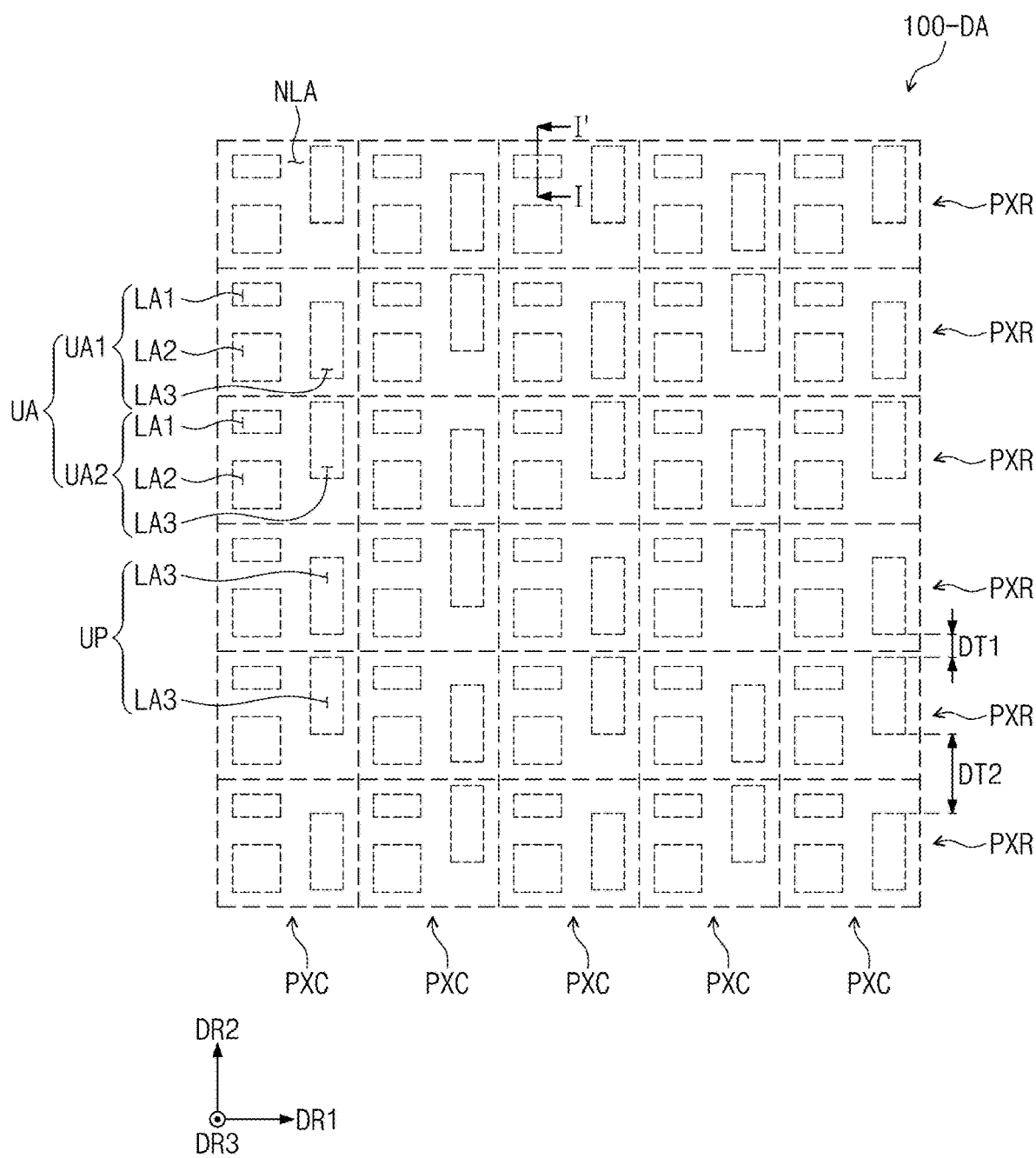
FIGS. 4A to 4C are enlarged plan views showing a display region according to some embodiments of the present invention.
Figure 4B:
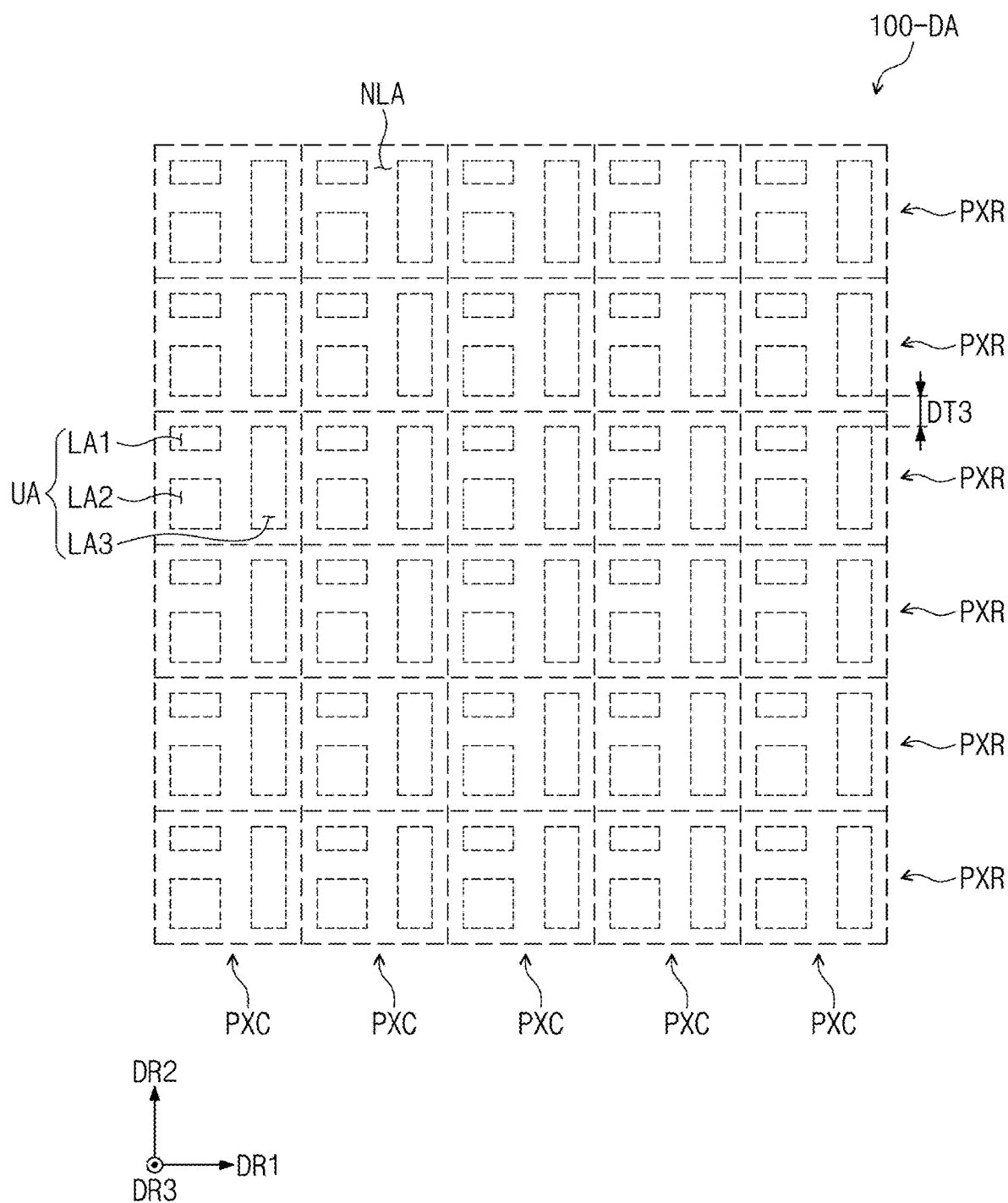
Figure 4C:
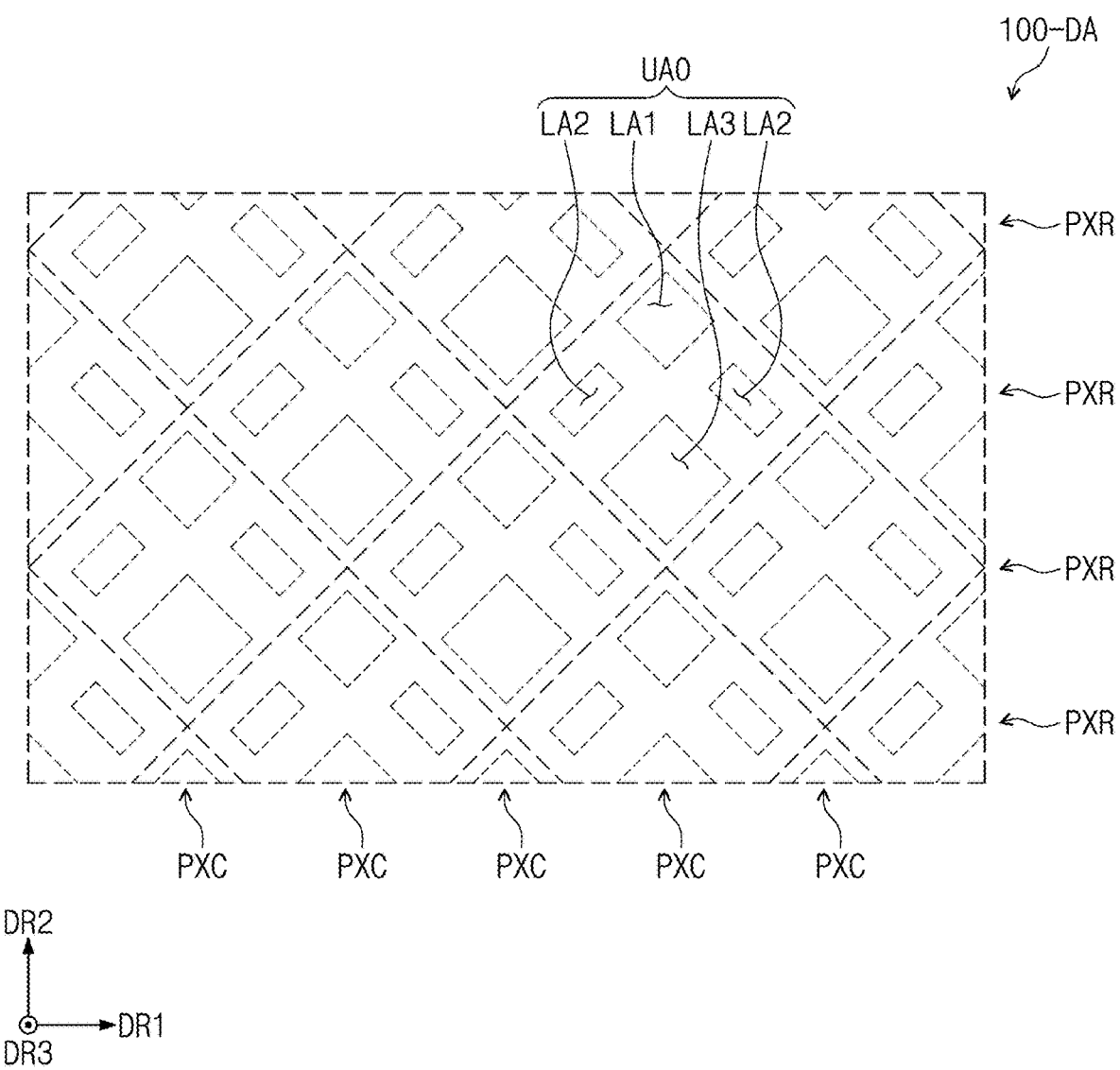

FIGS. 4A to 4C are enlarged plan views showing the display region 100-DA according to some embodiments of the present invention.

Referring to FIG. 4A, the display region 100-DA may include a plurality of emission regions LA1, LA2, and LA3 and a non-emission region NLA adjacent to the plurality of emission regions LA1, LA2, and LA3. The non-emission region NLA may define a boundary of the emission regions LA1, LA2, and LA3.

There may be a one-to-one correspondence between the pixels PX of FIG. 3 and the emission regions LA1, LA2, and LA3. Each of the pixels PX may include a light-emitting element, and the emission regions LA1, LA2, and LA3 may be a region though which is emitted light formed in the light-emitting element. An arrangement relationship between the non-emission region NLA and the emission regions LA1, LA2, and LA3 will be discussed with reference to FIG. 5.

The emission regions LA1, LA2, and LA3 may include a first emission region LA1 (or a first color emission region) that produces first color light, a second emission region LA2 (or a second color emission region) that produces second color light, and the third emission region LA3 (or a third color emission region) that produces third color light. In some examples, the first color light may be red light, the second color light may be green light, and the third color light may be blue light.

The first, second, and third emission regions LA1, LA2, and LA3 may have different areas from each other, but the present invention is not limited thereto. In some embodiments, the first emission region LA1 has a minimum area from among the areas of the emission regions LA1, LA2, and LA3, and the third emission region LA3 has a maximum area from among the areas of the emission regions LA1, LA2, and LA3.

The first emission region LA1, the second emission region LA2, and the third emission region LA3 may define a single unit emission region UA. The unit emission region UA may be a repetitive arrangement unit of emission regions disposed on the display region 100-DA. In some embodiments, the unit emission region UA includes a first unit emission region UA1 and a second unit emission region UA2.

Referring to the first unit emission region UA1 and the second unit emission region UA2, the first emission region LA1 and the second emission region LA2 may be disposed in the first direction DR1 on one side (e.g., a left side shown in FIG. 4A) of the third emission region LA3. In each of the first unit emission region UA1 and the second unit emission region UA2, the second emission region LA2 may be disposed in the first direction DR1 on one side (e.g., a downward side shown in FIG. 4A) of the first emission region LA1.

In the first unit emission region UA1 and the second unit emission region UA2, there may be a difference in position of the third emission region LA3 with respect to the first emission region LA1 and the second emission region LA2. Referring to the first unit emission region UA1, the third emission region LA3 may be disposed at a position relatively lower (e.g., along the second direction DR2) with respect to the first emission region LA1 and the second emission region LA2. Referring to the second unit emission region UA2, the third emission region LA3 may be disposed at a position relatively higher (e.g., along the second direction DR2) with respect to the first emission region LA1 and the second emission region LA2. In the first unit emission region UA1 and the second unit emission region UA2, there may be a difference in the degree of shift of the third emission region LA3 from the first emission region LA1 and the second emission region LA2. In some embodiments, the third emission region LA3 is relatively more shifted along a direction (e.g., along the second direction DR2) in the second unit emission region UA2 than on the first unit emission region UA1. In the first unit emission region UA1 and the second unit emission region UA2, there may be a same in the degree of shift of the third emission region LA3 from the first emission region LA1 and the second emission region LA2.

The first unit emission region UA1 and the second unit emission region UA2 may be alternately disposed along the first direction DR1 in a pixel row PXR. The first unit emission region UA1 and the second unit emission region UA2 may also be alternately disposed along the second direction DR2 in a pixel column PXC. The third emission region LA3 of the first unit emission region UA1 and the third emission region LA3 of the second unit emission region UA2 may be arranged in accordance with a particular pattern (e.g., a certain rule) depending on the arrangement of the first unit emission region UA1 and the second unit emission region UA2. The third emission regions LA3 of two adjacent first and second unit emission regions UA1 and UA2 may be disposed relatively close to and spaced apart from each other at a first interval (e.g., a first distance or separation) DT1 (e.g., along the second direction DR2). An emission region pair UP may be defined by the third emission region LA3 of the first unit emission region UA1 and the third emission region LA3 of the adjacent second unit emission region UA2, where the third emission regions LA3 are spaced apart from each other at the first interval DT1. The emission region pairs UP may be spaced apart from each other at a second interval (e.g., a second distance or separation) DT2 in each pixel column PXC. The second interval DT2 may be greater than the first interval DT1.

The emission region pair UP may be formed by a mask used for deposition. A unitary emission layer may be included in a light-emitting element disposed on the third emission region LA3 of the first unit emission region UA1 and a light-emitting element disposed on the third emission region LA3 of the second unit emission region UA2. For example, a single mask may be used to deposit an emission layer disposed at the third emission region LA3 of the first unit emission region UA1 and an emission layer disposed at the third emission region LA3 of the second unit emission region UA2. The mask may have openings that correspond to the emission region pair UP. A region between the openings may correspond to a shield region of the mask. As the openings are defined to correspond to the emission region pairs UP, the number of the openings may be reduced to secure a width of the shield region of the mask, which shield region is disposed between the openings in the second direction DR2. A thin mask may be utilized to secure a width of its shield region in the second direction DR2 so as to suppress or substantially reduce the occurrence of sagging in a deposition process.

This may be seen by comparing a third interval (e.g., a third distance or separation) DT3 between the third emission regions LA3 illustrated in FIG. 4B. Referring to FIG. 4B, one type of unit emission region UA may be disposed on the display region 100-DA. The third interval DT3 between the third emission regions LA3 of neighboring unit emission regions UA in the pixel column PXC may be less than the second interval DT2 of FIG. 4B. A mask used for forming the third emission regions LA3 of FIG. 4B may have a large number of openings (e.g., mask openings) and a relatively small width of a light-shield region. This may be caused by the fact that a mask for forming emission layers on the third emission regions LA3 shown in FIG. 4B has openings that correspond to the third emission regions LA3.

Referring to FIG. 4C, one type of unit emission region UA0 may be disposed on the display region 100-DA. The unit emission region UA0 may include second emission regions LA2 that are disposed spaced apart from each other in the first direction DR1, and may also include a first emission region LA1 and a third emission region LA3 that are disposed spaced apart from each other in the second direction DR2. The four emission regions LA1, LA2, and LA3 of the unit emission region UA0 may be arranged in a rhombic shape. The unit emission regions UA0 in the pixel rows PXR may be arrayed along (e.g., arranged in an array along) the first direction DR1. The unit emission regions UA0 may be disposed staggered along the first direction DR1 in neighboring pixel rows PXR. The unit emission regions UA0 may be disposed staggered along the second direction DR2 in neighboring pixel columns PXC.

Figure 5:
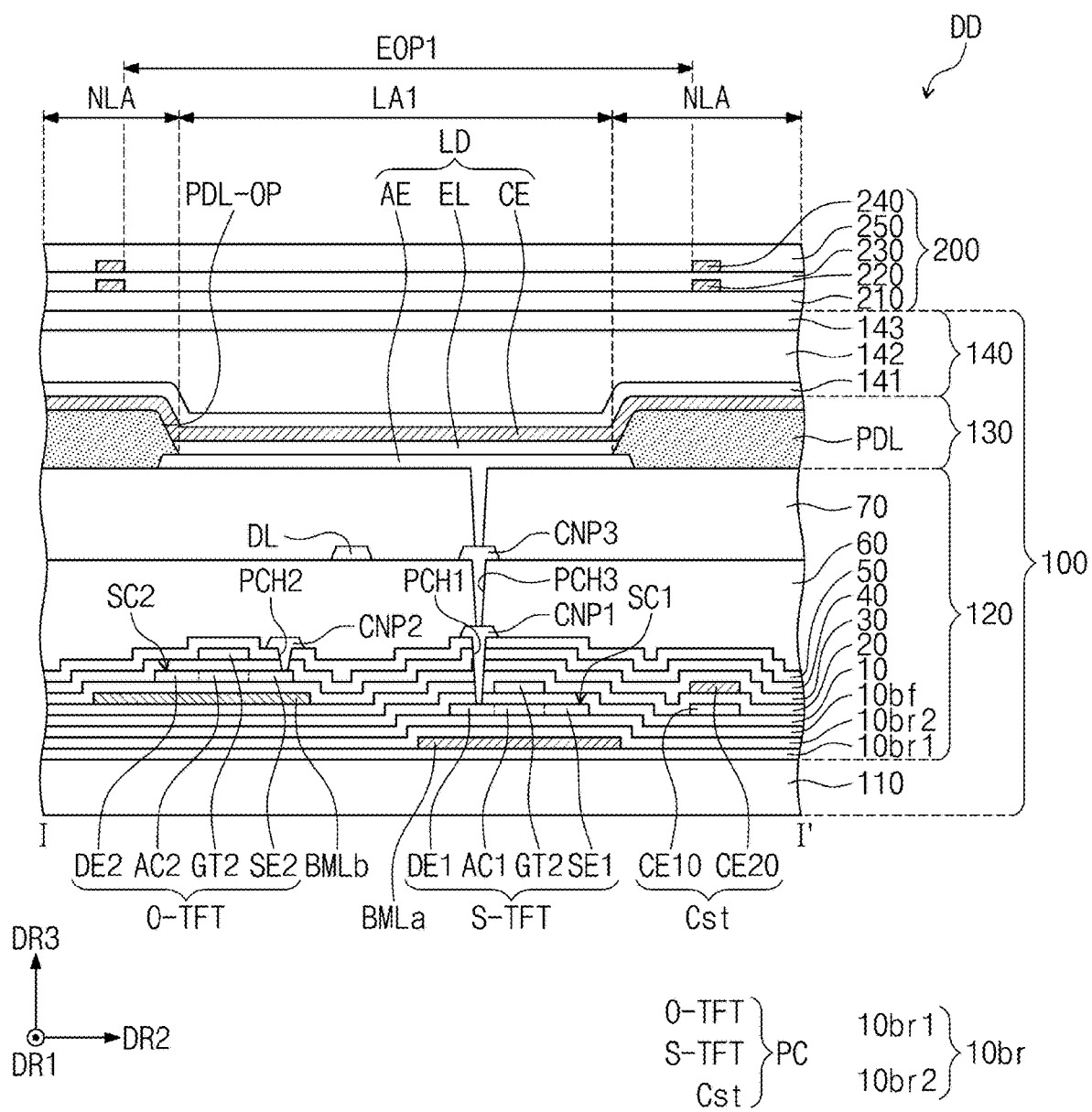
FIG. 5 is a cross-sectional view taken along the line I-I' of FIG. 4A, according to some embodiments of the present invention.

FIG. 5 is a cross-sectional view showing the display device DD taken along the line I-I' of FIG. 4A, according to some embodiments of the present invention. For ease of illustration, FIG. 5 omits an illustration of some components of the display device DD, for example, the antireflection layer 300, the adhesion layer PSA, and the window WM of FIG. 2.

A plurality of pixel driving elements may be included in a pixel driver circuit PC that drives a light-emitting element LD. The pixel driver circuit PC may include a capacitor Cst and a plurality of transistors S-TFT and O-TFT. FIG. 5 depicts a silicon transistor S-TFT and an oxide transistor O-TFT as examples of a transistor. The pixel driver circuit PC of FIG. 5 is merely example, and a configuration of the pixel driver circuit PC is not limited thereto. The pixel driver circuit PC may include only one of the silicon transistor S-TFT and the oxide transistor O-TFT.

Referring to FIG. 5, the base layer 110 may have a single-layered structure. The base layer 110 may include a synthetic resin, such as polyimide or the like. The base layer 110 may be formed by coating a synthetic resin layer on a work substrate (or a carrier substrate). A subsequent process may be performed to form the display module DM, and then the work substrate may be removed. In some embodiments of the present invention, the base layer 110 has a multi-layered structure including a first synthetic resin layer, at least one inorganic layer, and a second synthetic resin layer.

Referring back to FIG. 5, a barrier layer 10br may be disposed on the base layer 110. The barrier layer 10br may prevent or substantially reduce introduction of foreign substances from the outside. The barrier layer 10br may include at least one inorganic layer. The barrier layer 10br may include a silicon oxide layer and a silicon nitride layer. In some examples, a plurality of the silicon oxide layer and the silicon nitride layer may be provided, and the silicon oxide layers and the silicon nitride layers may be alternately stacked on one another.

The barrier layer 10br may include a lower barrier layer 10br1 and an upper barrier layer 10br2. A first shield electrode BMLa may be disposed between the lower barrier layer 10br1 and the upper barrier layer 10br2. The first shield electrode BMLa may be disposed to correspond to the silicon transistor S-TFT. The first shield electrode BMLa may include metal, for example, molybdenum, and/or the like.

The first shield electrode BMLa may receive a bias voltage. The first shield electrode BMLa may receive a first power voltage. The first shield electrode BMLa may prevent the silicon transistor S-TFT from being affected by a polarization-induced electric potential. The first shield electrode BMLa may prevent external light from reaching the silicon transistor S-TFT. In some embodiments of the present invention, the first shield electrode BMLa is a floating electrode that is isolated (e.g., electrically isolated) from other electrodes or wiring lines.

A buffer layer 10bf may be disposed on the barrier layer 10br. The buffer layer 10bf may prevent metal elements or impurities from diffusing from the base layer 110 toward an overlying first semiconductor pattern SC1, or substantially reduce such diffusion. The buffer layer 10bf may include at least one inorganic layer. The buffer layer 10bf may include a silicon oxide layer and a silicon nitride layer.

The first semiconductor pattern SC1 may be disposed on the buffer layer 10bf. The first semiconductor pattern SC1 may include a silicon semiconductor. For example, the silicon semiconductor may include amorphous silicon or polycrystalline silicon. For example, the first semiconductor pattern SC1 may include low-temperature polysilicon.

The first semiconductor pattern SC1 may have electrical properties that are changed based on whether the first semiconductor pattern SC1 is doped or not. The first semiconductor pattern SC1 may include a first section, whose conductivity is high, and a second section, whose conductivity is low. The first section may be doped with n-type or p-type impurities. The second section may be an undoped section or may be a doped section implanted with impurities whose concentration is less than that of impurities doped in the first section. The silicon transistor S-TFT may include a source section SE1, a channel section AC1 (or an active section), and a drain section DE1, all of which are formed from the first semiconductor pattern SC1. The source section SE1 and the drain section DE1 may extend in opposite directions from the channel section AC1 when viewed in a vertical cross-sectional view.

A first insulation layer 10 may be disposed on the buffer layer 10bf. The first insulation layer 10 may cover the first semiconductor pattern SC1. The first insulation layer 10 may be an inorganic layer. The first insulation layer 10 may be a single-layered silicon oxide layer. Likewise, the first insulation layer 10, an inorganic layer of the driving element layer 120, which will be discussed below, may have a single-layered or multi-layered structure, and may include at least one of the materials mentioned above, but the present invention is not limited thereto.

A gate GT1 of the silicon transistor S-TFT may be disposed on the first insulation layer 10. The gate GT1 may be a portion of a metal pattern. The gate GT1 may overlap the channel section AC1. The gate GT1 may serve as a mask in a process where the first semiconductor pattern SC1 is doped. The first insulation layer 10 may be provided thereon with a first electrode CE10 of the capacitor Cst. Differently from that shown in FIG. 5, the first electrode CE10 and the gate GT1 may collectively have a single unitary shape.

The first insulation layer 10 may be provided thereon with a second insulation layer 20 that covers the gate GT1. In some embodiments of the present invention, the second insulation layer 20 is provided thereon with an upper electrode that overlaps the gate GT1. The second insulation layer 20 may be provided thereon with a second electrode CE20 that overlaps the first electrode CE10. The upper electrode and the second electrode CE20 may collectively have a single unitary shape when viewed in plan.

A second shield electrode BMLb may be disposed on the second insulation layer 20. The second shield electrode BMLb may be disposed to correspond to the oxide transistor O-TFT. In some embodiments of the present invention, the second shield electrode BMLb may be omitted. According to some embodiments of the present invention, the first shield electrode BMLa extends to a location below the oxide transistor O-TFT to replace the second shield electrode BMLb.

A third insulation layer 30 may be disposed on the second insulation layer 20. A second semiconductor pattern SC2 may be disposed on the third insulation layer 30. The second semiconductor pattern SC2 may include a channel section AC2 of the oxide transistor O-TFT. The second semiconductor pattern SC2 may include a metal oxide semiconductor. The second semiconductor pattern SC2 may include transparent conductive oxide (TCO), such as indium tin oxide (ITO), indium zinc oxide (IZO), indium gallium zinc oxide (IGZO), zinc oxide (ZnOx), indium oxide ($In_2O_3$), and/or the like.

The metal oxide semiconductor may include a plurality of sections SE2, AC2, and DE2 that are distinguished depending on whether the transparent conductive oxide is reduced or not. A section (or a reducing section) where the transparent conductive oxide is reduced may have conductivity greater than that of a section (or a non-reducing section) where the transparent conductive oxide is not reduced. The reducing section may substantially serve as a signal line or a source/drain of a transistor. The non-reducing section may substantially correspond to a semiconductor section (or a channel) of a transistor. A fourth insulation layer 40 may be disposed on the third insulation layer 30. As shown in FIG. 5, the fourth insulation layer 40 may cover the second semiconductor pattern SC2. In some embodiments of the present invention, the fourth insulation layer 40 is a dielectric pattern that overlaps a gate GT2 of the oxide transistor O-TFT and exposes a source section SE2 and a drain section DE2 of the oxide transistor O-TFT.

The gate GT2 of the oxide transistor O-TFT may be disposed on the fourth insulation layer 40. The gate GT2 of the oxide transistor O-TFT may be a portion of a metal pattern. The gate GT2 of the oxide transistor O-TFT may overlap the channel section AC2 of the oxide transistor O-TFT (in a plan view). The fourth insulation layer 40 may be provided thereon with a fifth insulation layer 50 that covers the gate GT2. Each of the first to fifth insulation layers 10 to 50 may be an inorganic layer.

A first connection pattern CNP1 and a second connection pattern CNP2 may be disposed on the fifth insulation layer 50. The first connection pattern CNP1 and the second connection pattern CNP2 may be formed by the same process to have the same or substantially the same material and stacked structure. The first connection pattern CNP1 may be coupled to the drain section DE1 of the silicon transistor S-TFT through a first pixel contact opening (e.g., a first pixel contact hole) PCH1 that penetrates the first, second, third, fourth, and fifth insulation layers 10, 20, 30, 40, and 50. The second connection pattern CNP2 may be coupled to the source section SE2 of the oxide transistor O-TFT through a second pixel contact opening (e.g., a second pixel contact hole) PCH2 that penetrates the fourth and fifth insulation layers 40 and 50. The connection relationship of the first connection pattern CNP1 with respect to the silicon transistor S-TFT is not limited to that discussed above, and likewise the connection relationship of the second connection pattern CNP2 with respect to the oxide transistor O-TFT is not limited to that discussed above.

A sixth insulation layer 60 may be disposed on the fifth insulation layer 50. A third connection pattern CNP3 may be disposed on the sixth insulation layer 60. The third connection pattern CNP3 may be coupled to the first connection pattern CNP1 through a third pixel contact opening (e.g., a third pixel contact hole) PCH3 that penetrates the sixth insulation layer 60. A data line DL may be disposed on the sixth insulation layer 60. The sixth insulation layer 60 may be provided thereon with a seventh insulation layer 70 that covers the third connection pattern CNP3 and the data line DL. The third connection pattern CNP3 and the data line DL may be formed by the same process to have the same or substantially the same material and stacked structure. Each of the sixth and seventh insulation layers 60 and 70 may be an organic layer.

The light-emitting element LD may include an anode AE (or a first electrode), an emission layer EL, and a cathode CE (or a second electrode). The anode AE of the light-emitting element LD may be disposed on the seventh insulation layer 70. The anode AE may be a transmissive electrode, transflective electrode, or a reflective electrode. The anode AE may have a stacked structure in which ITO, Ag, and ITO are sequentially stacked. The anode AE and the cathode CE may be interchangeably positioned.

A pixel definition layer PDL may be disposed on the seventh insulation layer 70. The pixel definition layer PDL may be an organic layer. The pixel definition layer PDL may exhibit light-absorbing properties and may have, for example, a black color. The pixel definition layer PDL may include a black coloring agent. The black coloring agent may include a black dye or a black pigment. The black coloring agent may include a carbon black, metal such as chromium, or oxide thereof. The pixel definition layer PDL may correspond to a light-shield pattern having light-shield properties.

The pixel definition layer PDL may cover a portion of the anode AE. For example, the pixel definition layer PDL may have an opening PDL-OP that is defined to expose a portion of the anode AE. An emission region LA1 may be defined to correspond to the opening PDL-OP. FIG. 5 depicts one emission region LA1 that corresponds to the first emission region LA1 of FIG. 4A. A cross-section that corresponds to the second emission region LA2 and the third emission region LA3 may be substantially the same as that of FIG. 5. However, the second emission region LA2 and the third emission region LA3 may include the emission layer EL whose material is different from that of the emission layer EL included in the first emission region LA1. In addition, referring to the emission region pair UP of FIG. 4A, the pixel definition layer PDL may be disposed between the third emission region LA3 of the first unit emission region UA1 and the third emission region LA3 of the second unit emission region UA2. The emission layer EL located on the third emission region LA3 of the first unit emission region UA1 and the third emission region LA3 of the second unit emission region UA2 may be disposed on the pixel definition layer PDL located between the third emission region LA3 of the first unit emission region UA1 and the third emission region LA3 of the second unit emission region UA2.

In some embodiments of the present invention, a hole control layer is disposed between the anode AE and the emission layer EL. The hole control layer may include a hole transport layer and may further include a hole injection layer. An electron control layer may be disposed between the emission layer EL and the cathode CE. The electron control layer may include an electron transport layer and may further include an electron injection layer.

The encapsulation layer 140 may cover the light-emitting element LD. The encapsulation layer 140 may include an encapsulation inorganic layer 141, an encapsulation organic layer 142, and an encapsulation inorganic layer 143 that are sequentially stacked; however, the layers included in the encapsulation layer 140 are not necessarily limited thereto. The encapsulation inorganic layers 141 and 143 may include a silicon nitride layer, a silicon oxynitride layer, a silicon oxide layer, a titanium oxide layer, or an aluminum oxide layer. Each of the encapsulation inorganic layers 141 and 143 may have a multi-layered structure. The encapsulation organic layer 142 may include an acryl-based organic layer, but the present invention is not limited thereto.

The input sensor 200 may include at least one conductive layer (e.g., at least one sensor conductive layer) and at least one insulation layer (e.g., at least one sensor insulation layer). In some embodiments, the input sensor 200 may include a first insulation layer 210 (e.g., a first sensor insulation layer), a first conductive layer 220 (e.g., a first sensor conductive layer), a second insulation layer 230 (e.g., a second sensor insulation layer), a second conductive layer 240 (e.g., a second sensor conductive layer), and a third insulation layer 250 (e.g., a third sensor insulation layer). FIG. 5 roughly depicts a conductive line of the first conductive layer 220 and a conductive line of the second conductive layer 240.

The first insulation layer 210 may be directly disposed on the display panel 100. The first insulation layer 210 may be an inorganic layer including at least one selected from silicon nitride, silicon oxynitride, and silicon oxide. Each of the first conductive layer 220 and the second conductive layer 240 may have a single-layered structure or a multi-layered structure in which layers are stacked along the third direction DR3. The first conductive layer 220 and the second conductive layer 240 may include conductive lines that define a mesh-type electrode (with crossing conductive lines). Based on position, the conductive line of the first conductive layer 220 and the conductive line of the second conductive layer 240 may be or not be connected to each other through a contact opening (e.g., a contact hole) that penetrates through the second insulation layer 230.

The first and second conductive layers 220 and 240 each having a single-layered structure may include a metal layer or a transparent conductive layer. The metal layer may include molybdenum, silver, titanium, copper, aluminum, or an alloy thereof. The transparent conductive layer may include transparent conductive oxide, such as indium tin oxide (ITO), indium zinc oxide (IZO), zinc oxide (ZnOx), indium zinc tin oxide (IZTO), and/or the like. Additionally or alternatively, the transparent conductive layer may include a graphene, a metal nano-wire, a conductive polymer such as poly(3,4-ethylenedioxythiophene) or PEDOT, and/or the like.

The first and second conductive layers 220 and 240 each having a multi-layered structure may include metal layers. The metal layers may include, for example, a tri-layered structure of titanium/aluminum/titanium. The multi-layered conductive layer may include at least one metal layer and at least one transparent conductive layer. The second insulation layer 230 may be disposed between the first conductive layer 220 and the second conductive layer 240. The third insulation layer 250 may cover the second conductive layer 240. In some examples, the third insulation layer 250 may be omitted. The second and third insulation layers 230 and 250 may include an inorganic layer or an organic layer.

Figure 6A:
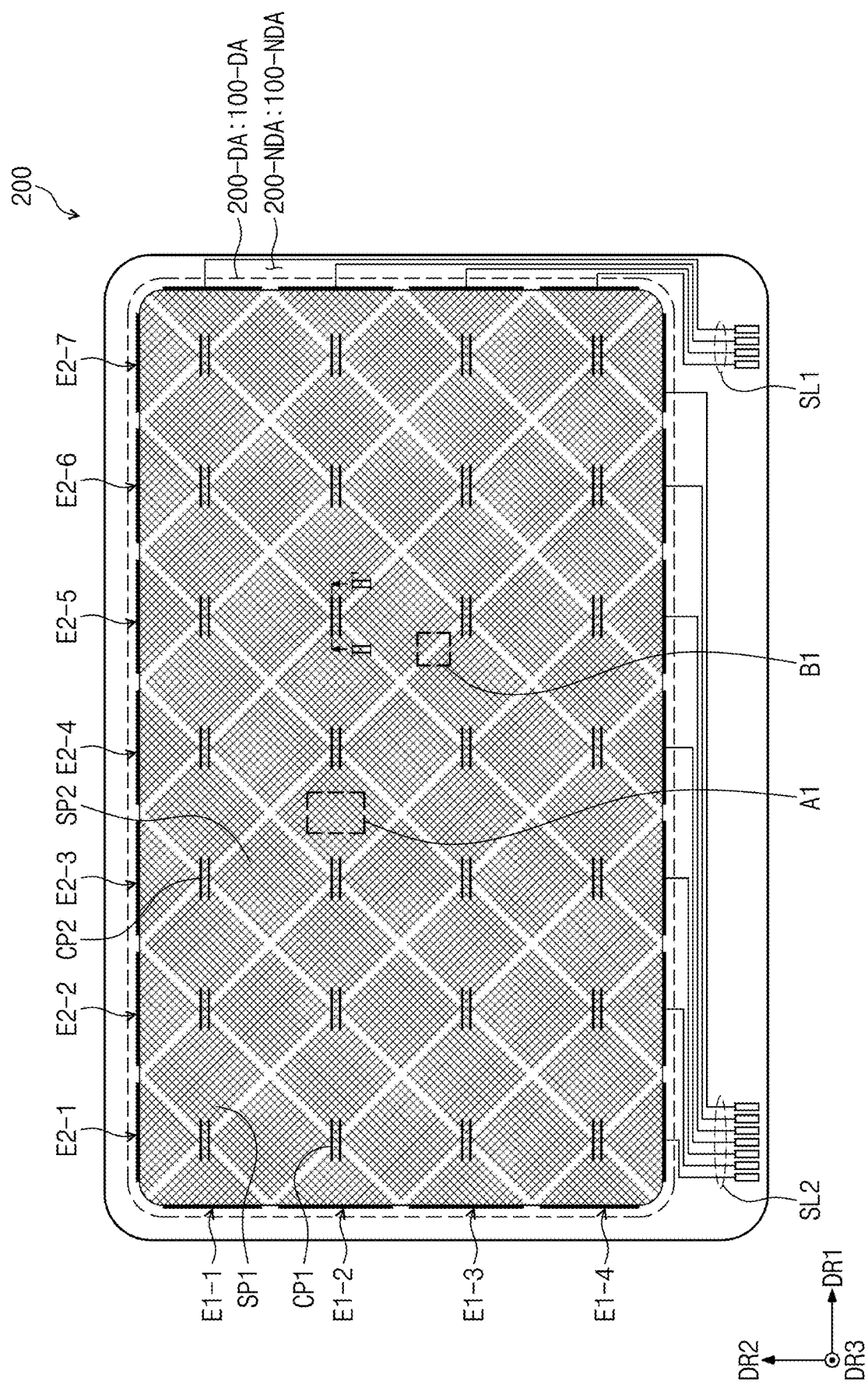
FIG. 6A is a plan view showing an input sensor according to an embodiment of the present invention.
Figure 6B:
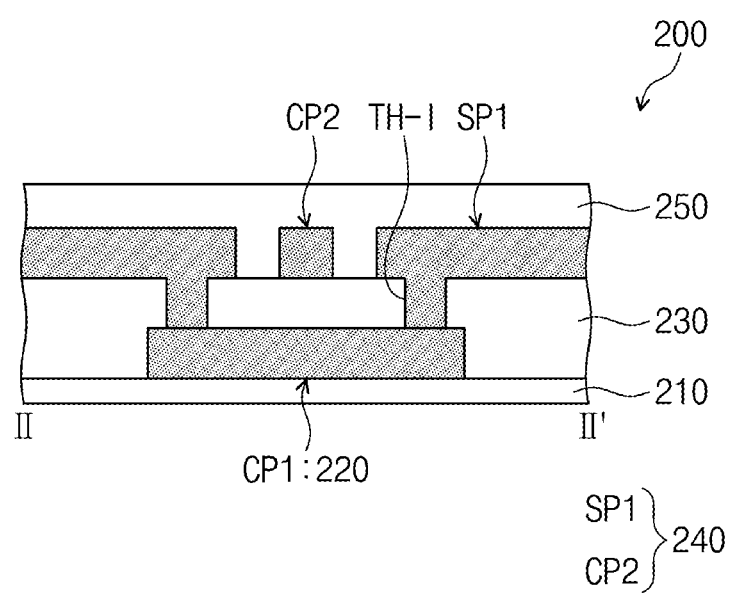
FIG. 6B is a cross-sectional view showing an input sensor taken along the line II-II' of FIG. 6A, according to some embodiments of the present invention.

FIG. 6A is a plan view showing the input sensor 200 according to some embodiments of the present invention. FIG. 6B is a cross-sectional view showing the input sensor 200 taken along the line II-II' of FIG. 6A, according to some embodiments of the present invention.

Referring to FIG. 6A, the input sensor 200 may include a sensing region 200-DA and a non-sensing region 200-NDA adjacent to (e.g., surrounding) the sensing region 200-DA. The sensing region 200-DA and the non-sensing region 200-NDA may respectively correspond to the display region 100-DA and the non-display region 100-NDA depicted in FIG. 3. The input sensor 200 may include first electrodes E1-1 to E1-4 (e.g., first sensing electrodes), second electrodes E2-1 to E2-7 (e.g., second sensing electrodes), first signal lines SL1 (e.g., first sensor signal lines), and second signal lines SL2 (e.g., second sensor signal lines).

The sensing region 200-DA may be provided thereon with the first electrodes E1-1 to E1-4 and the second electrodes E2-1 to E2-7 that are insulated from and crossing the first electrodes E1-1 and E1-4. The non-sensing region 200-NDA may be provided thereon with the first signal lines SL1 electrically connected to the first electrodes E1-1 to E1-4 and the second signal lines SL2 electrically connected to the second electrodes E2-1 to E2-7. One of the first signal lines SL1 and the second signal lines SL2 may provide a corresponding electrode with a driving signal for sensing an external input from an external circuit, and another of the first signal lines SL1 and the second signal lines SL2 may output a sensing signal. A change in capacitance between the first electrodes E1-1 to E1-4 and the second electrodes E2-1 to E2-7 may be measured based on a sensing signal. Here, an input sensor using mutual capacitance is depicted by way of example, but the present invention is not limited thereto. An input sensor using self-capacitance may be applied. An input sensor using self-capacitance may include one type of sensing electrodes.

The first electrodes E1-1 to E1-4 and the second electrodes E2-1 to E2-7 may have a mesh shape on which a plurality of opening regions are defined. The plurality of opening regions may correspondingly overlap the plurality of emission regions LA1, LA2, and LA3 illustrated in FIG. 4A. The second electrodes E2-1 to E2-7 may be insulated from and cross the first electrodes E1-1 to E1-4. The first electrodes E1-1 to E1-4 or the second electrodes E2-1 to E2-7 may have a single unitary shape. Here, the second electrodes E2-1 to E2-7 are illustrated by way of example as a single unitary shape.

The second electrodes E2-1 to E2-7 may include sensing parts SP2 and middle parts CP2. The sensing parts SP2 may have a rhombic shape and an area greater than that of the middle parts CP2. Each of the middle parts CP2 may be disposed between two neighboring ones of the sensing parts SP2. The middle parts CP2 may have a relatively small length, and may be omitted in some examples. In such examples, the sensing part SP2 may directly extend from its adjacent sensing part SP2.

Each of the first electrodes E1-1 to E1-4 may include sensing patterns SP1 and bridge patterns CP1 (or connection patterns). Two neighboring sensing patterns SP1 may be connected through two bridge patterns CP1, but there is no limitation imposed on the number of bridge patterns.

Referring to FIGS. 6A and 6B, bridge patterns CP1 may be formed from the first conductive layer 220, and the plurality of first electrodes E1-1 to E1-4 and the sensing patterns SP1 may be formed from the second conductive layer 240. The bridge pattern CP1 may be connected to the sensing patterns SP1 through a contact opening (e.g., contact hole) TH-1 formed in (e.g., penetrating through) the second insulation layer 230. In some embodiments of the present invention, the bridge patterns CP1 is formed from the second conductive layer 240, and the sensing patterns SP1 and the plurality of first electrodes E1-1 to E1-4 are formed from the first conductive layer 220.

In some embodiments, each of the first signal lines SL1 and the second signal lines SL2 illustrated FIG. 6A may be formed from the first conductive layer 220 shown in FIG. 6B. Therefore, each of the first signal lines SL1 and the second signal lines SL2 illustrated in FIG. 6A may be disposed on the same layer as the bridge pattern CP1 depicted in FIG. 6B. The present invention, however, is not limited thereto, and each of the first signal lines SL1 and the second signal lines SL2 may be formed from the second conductive layer 240, according to some examples. Each of the first signal lines SL1 and the second signal lines SL2 may include all of the line formed from the first conductive layer 220 and the line formed from the second conductive layer 240.

Figure 7A:
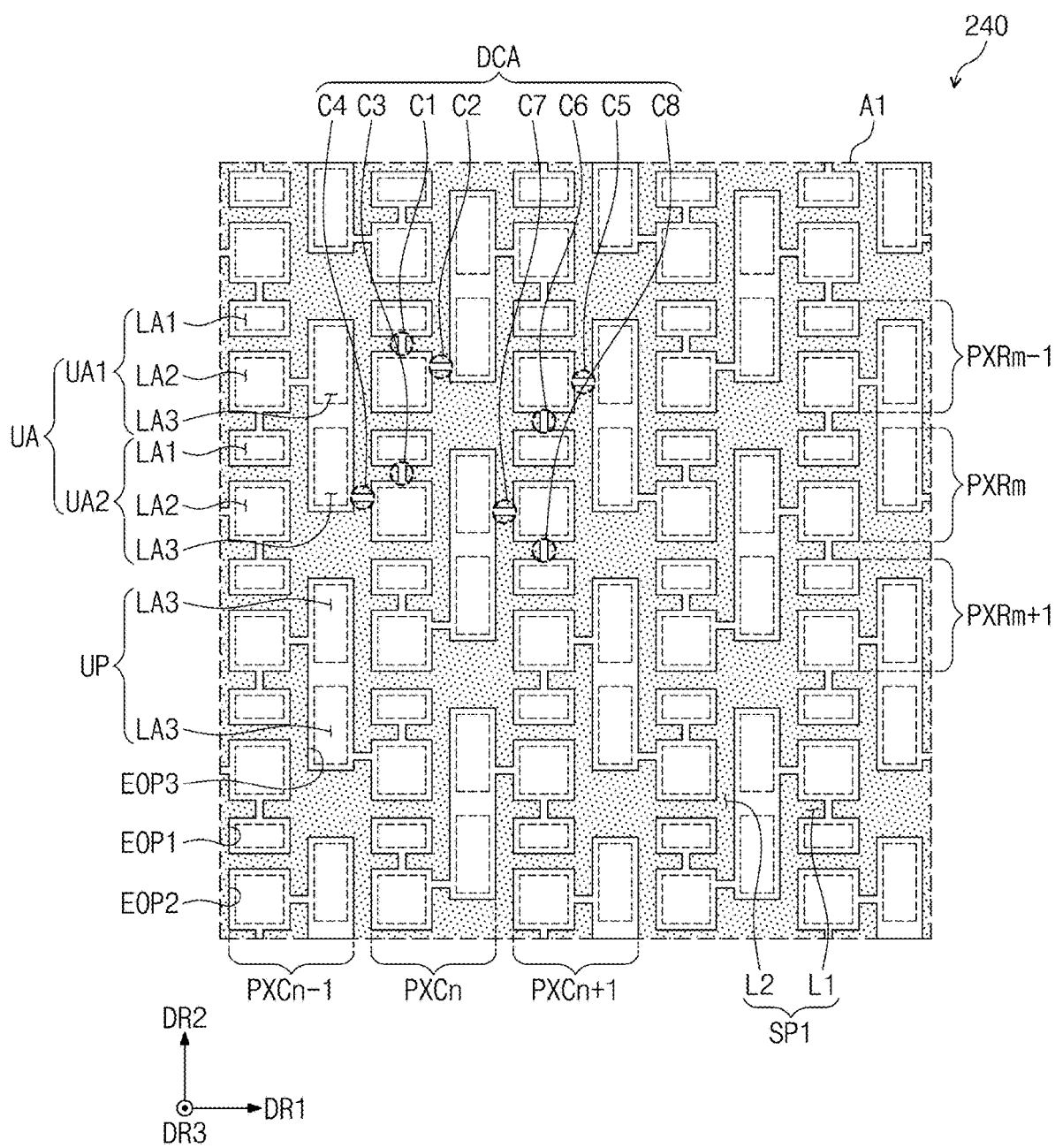
FIG. 7A is an enlarged plan view showing a second conductive layer that corresponds to a first region of FIG. 6A, according to some embodiments of the present invention.
Figure 7B:
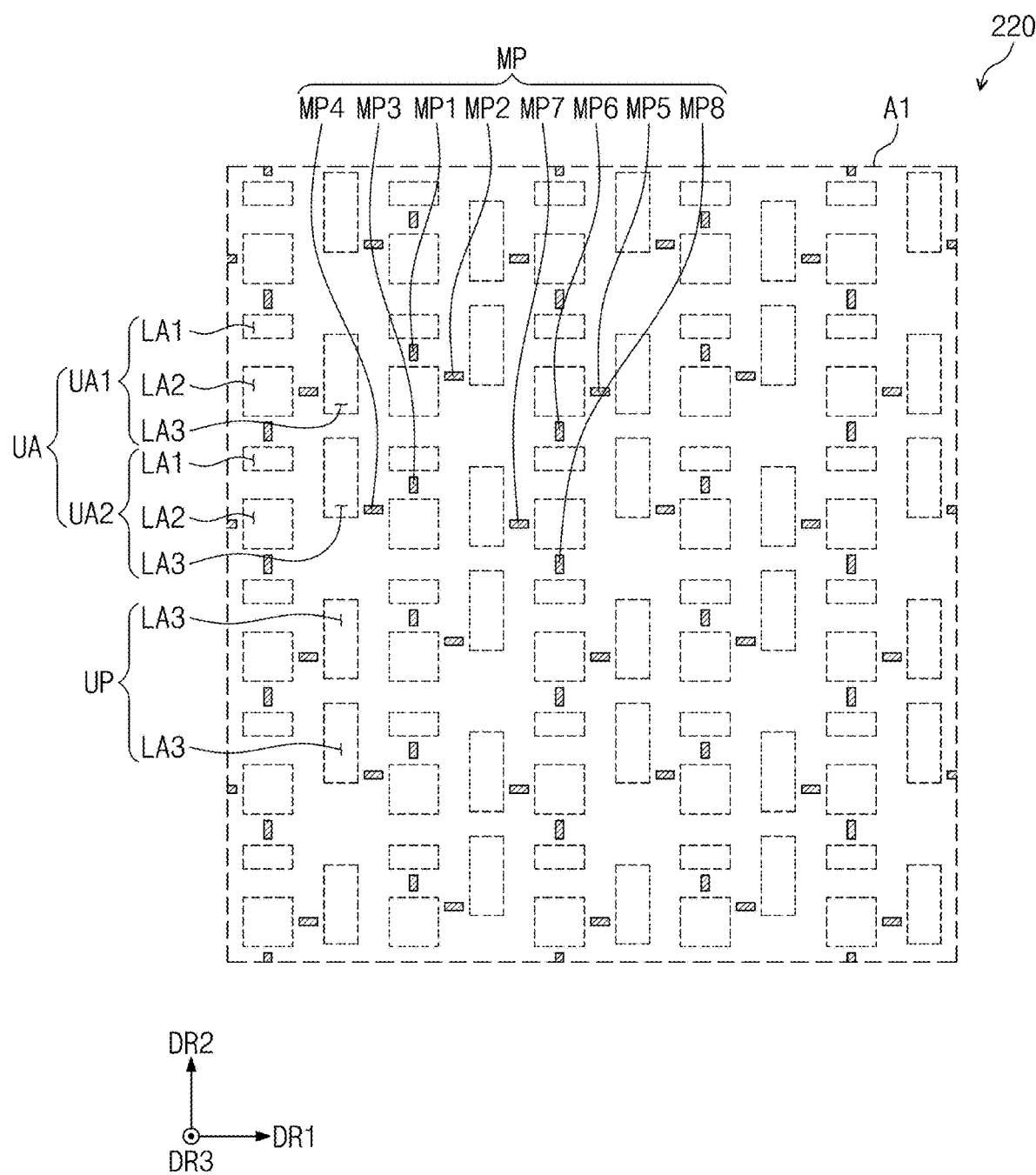
FIG. 7B is an enlarged plan view showing a first conductive layer that corresponds to a first region of FIG. 6A, according to some embodiments of the present invention.
Figure 7C:
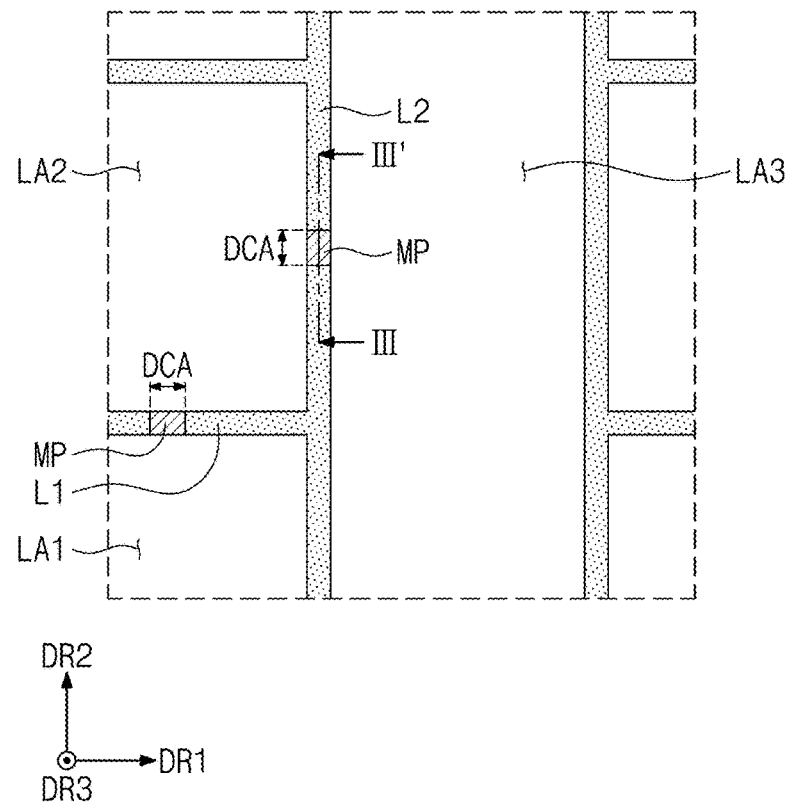
FIG. 7C is an enlarged plan view partially showing a first region of FIG. 6A, according to some embodiments of the present invention.
Figure 7D:
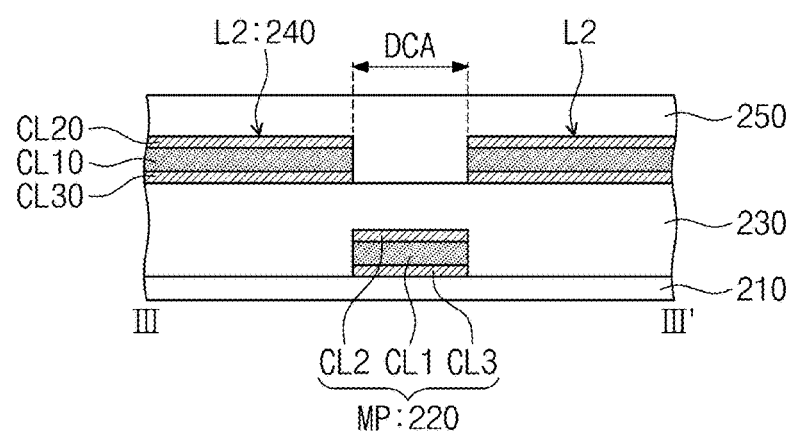
FIG. 7D is a cross-sectional view taken along the line III-III' of FIG. 7C, according to some embodiments of the present invention.
Figure 7E:
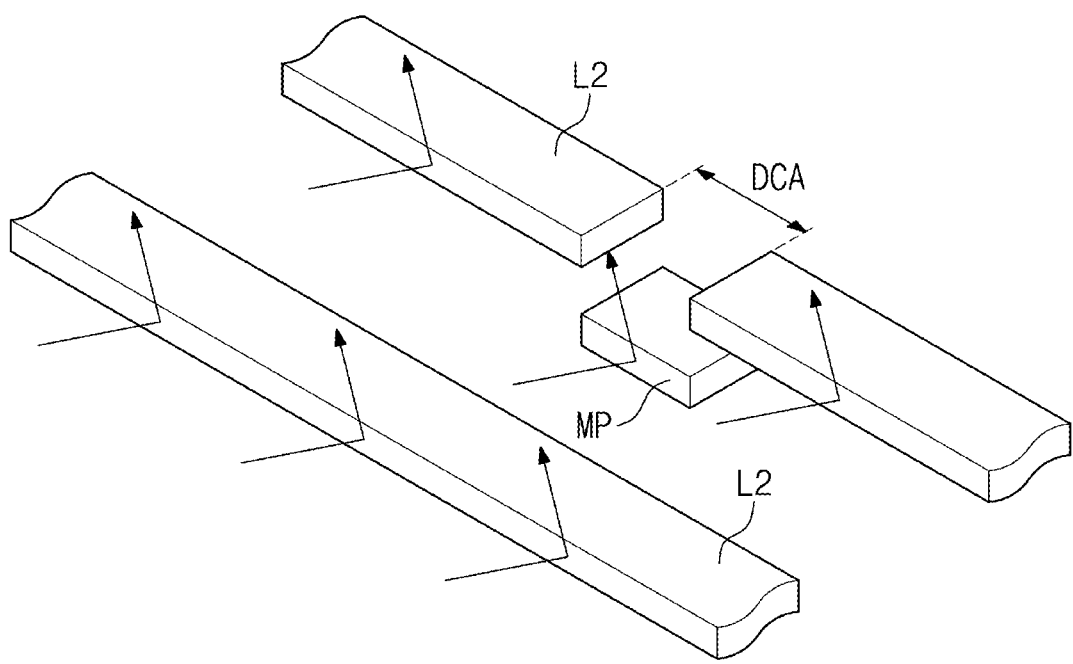
FIG. 7E is a perspective view showing the reflection of external light produced on a partial region depicted in FIG. 7C, according to some embodiments of the present invention.

FIG. 7A is an enlarged plan view showing the second conductive layer 240 that corresponds to a first region A1 of FIG. 6A, according to some embodiments of the present invention. FIG. 7B is an enlarged plan view showing the first conductive layer 220 that corresponds to a first region A1 of FIG. 6A, according to some embodiments of the present invention. FIG. 7C is an enlarged plan view partially showing a first region A1 of FIG. 6A, according to some embodiments of the present invention. FIG. 7D is a cross-sectional view taken along line III-III' of FIG. 7C, according to some embodiments of the present invention. FIG. 7E is a perspective view showing the reflection of external light produced on a partial region depicted in FIG. 7C, according to some embodiments of the present invention.

In FIGS. 7A to 7D, the second conductive layer 240 may indicate the second conductive layer 240 of FIG. 5, and the first conductive layer 220 may correspond to the first conductive layer 220 of FIG. 5. FIG. 7A shows an enlarged illustration of the sensing pattern SP1 formed from the second conductive layer 240. The sensing patterns SP1 are shown as a representative of the first electrodes E1-1 to E1-4. FIGS. 7A and 7B also depict the display region 100-DA illustrated in FIG. 4A. The sensing parts SP2 may have the same structure as that of the sensing patterns SP1.

Referring to FIG. 7A, the sensing pattern SP1 may have a plurality of opening regions EOP1, EOP2, and EOP3 defined therein. The plurality of opening regions EOP1, EOP2, and EOP3 may include a first opening region EOP1 that corresponds to (e.g., overlaps) the first emission region LA1, a second opening region EOP2 that corresponds to the second emission region LA2, and a third opening region EOP3 that corresponds to the emission region pair UP.

In some embodiments, the first emission region LA1 is disposed inside the first opening region EOP1, the second emission region LA2 is disposed inside the second opening region EOP2, and the emission region pair UP is disposed inside the third opening region EOP3. The third opening region EOP3 may be provided thereinside in common with the third emission region LA3 of the first unit emission region UA1 illustrated in FIG. 4A and the third emission region LA3 of the second unit emission region UA2 illustrated in FIG. 4A. In some embodiments of the present invention, the third opening region EOP3 may be formed on every one of the third emission regions LA3 of the first and second unit emission regions UA1 and UA2. In such examples, a first line segment L1 which will be discussed above may be disposed in a region between the third emission region LA3 of the first unit emission region UA1 and the third emission region LA3 of the second unit emission region UA2.

The sensing pattern SP1 may include a plurality of line segments L1 and L2 that define the plurality of opening regions EOP1, EOP2, and EOP3. The plurality of line segments L1 and L2 may include a first segment L1 and a second line segment L2 that extend in intersecting directions. In some embodiments, the first line segments L1 extends in the first direction DR1, and the second line segments L2 extends in the second direction DR2.

Each of the first line segments L1 may extend from one second line segment L2 toward another second line segment L2 adjacent to the one second line segment L2. The first line segments L1 may be disposed between two opening regions among the plurality of opening regions EOP1, EOP2, and EOP3, which are adjacent in the second direction DR2, and may include line segments of a plurality of groups that are distinguished based on a width in the second direction DR2.

The plurality of line segments L1 and L2 may have cut regions DCA defined therein. The cut regions DCA may be regions where the line segments L1 and L2 are removed. The cut regions DCA may reduce visibility of a boundary region between the first electrodes E1-1 to E1-4 and the second electrodes E2-1 to E2-7 depicted in FIG. 6A. As the cut regions DCA are formed in conformity with a particular pattern (e.g., certain rule) in the first electrodes E1-1 to E1-4 and the second electrodes E2-1 to E2-7 depicted in FIG. 6A, on the sensing region 200-DA depicted in FIG. 6A, it may be possible to recognize the boundary region and the cut regions DCA between the first electrodes E1-1 to E1-4 and the second electrodes E2-1 to E2-7.

Visibility Level 1 may be defined to indicate a state in which only the boundary region is clearly visible because the cut regions DCA are not formed between the first electrodes E1-1 to E1-4 and the second electrodes E2-1 to E2-7. At Visibility Level 1, the first electrodes E1-1 to E1-4 and the second electrodes E2-1 to E2-7 may be easily recognized in terms of position and shape. Visibility Level 2 may be defined to indicate a state in which the boundary region between the first electrodes E1-1 to E1-4 and the second electrodes E2-1 to E2-7 is less visible because the cut regions DCA are formed in the first electrodes E1-1 to E1-4 and the second electrodes E2-1 to E2-7. At Visibility Level 2, the first electrodes E1-1 to E1-4 and the second electrodes E2-1 to E2-7 may be recognized in terms of presence, but might not be exactly recognized in terms of position and shape. This may be caused by the fact that the cut regions DCA reduce visibility of the boundary region.

In some embodiments, the cut regions DCA include first to eighth cut regions C1 to C8. A unit (also referred to hereinafter as a cut unit) may be constituted by the first to eighth cut regions C1 to C8, and may be repeatedly formed in the first electrodes E1-1 to E1-4 and the second electrodes E2-1 to E2-7. FIG. 7A depicts a bundle of the first to eighth cut regions C1 to C8 included in a single cut unit.

In the following description, positions of the first to eighth cut regions C1 to C8 will be discussed based on regions where there are disposed an $(m-1)^{th}$ pixel row PXRm-1, an $m^{th}$ pixel row PXRm, an $(m+1)^{th}$ pixel row PXRm+1, an $(n-1)^{th}$ pixel column PXCn-1, an $n^{th}$ pixel column PXCn, and an $(n+1)^{th}$ pixel column PXCn+1. The subscripts m and n may each be a natural number equal to or greater than 2. The first unit emission region UA1 may be disposed on each of an intersection between the $(m-1)^{th}$ pixel row PXRm-1 and the $(n-1)^{th}$ pixel column PXCn-1, an intersection between the $(m+1)^{th}$ pixel row PXRm+1 and the $(n-1)^{th}$ pixel column PXCn-i, an intersection between the $m^{th}$ pixel row PXRm and the $n^{th}$ pixel column PXCn, an intersection between the $(m-1)^{th}$ pixel row PXRm-1 and the $(n+1)^{th}$ pixel column PXCn+1, and an intersection between the $(m+1)^{th}$ pixel row PXRm+1 and the $(n+1)^{th}$ pixel column PXCn+1. The second unit emission region UA2 may be disposed on each of an intersection between the $m^{th}$ pixel row PXRm and the $(n-1)^{th}$ pixel column PXCn-1, an intersection between the $(m-1)^{th}$ pixel row PXRm-1 and the $n^{th}$ pixel column PXCn, an intersection between the $(m+1)^{th}$ pixel row PXRm+1 and the $n^{th}$ pixel column PXCn, and an intersection between the $m^{th}$ pixel row PXRm and the $(n+1)^{th}$ pixel column PXCn+1.

The first to eighth cut regions C1 to C8 may be divided into four pairs (or cut region pairs). Each of the four cut region pairs may include two cut regions that are closest to each other among the first to eighth cut regions C1 to C8. The first cut region C1 and the second cut region C2 may constitute one pair, the third cut region C3 and the fourth cut region C4 may constitute one pair, the fifth cut region C5 and the sixth cut region C6 may constitute one pair, and the seventh cut region C7 and the eighth cut region C8 may constitute one pair. One cut region of a pair of cut regions may be defined on the first line segment L1, and the other cut region of the pair of cut regions may be defined on the second line segment L2.

The first cut region C1 may be disposed on the $n^{th}$ pixel column PXCn, and may be formed on the first line segment L1 located between the first emission region LA1 of the (m-1)th pixel row PXRm-1 and the second emission region LA2 of the $(m-1)^{th}$ pixel row PXRm-1. The second cut region C2 may be disposed on the (m-1)th pixel row PXRm-1, and may be formed on the second line segment L2 located between the second emission region LA2 of the $n^{th}$ pixel column PXCn and the third emission region LA3 of the $n^{th}$ pixel column PXCn. The third cut region C3 may be disposed on the $n^{th}$ pixel column PXCn, and may be formed on the first line segment L1 located between the first emission region LA1 of the $m^{th}$ pixel row PXRm and the second emission region LA2 of the $m^{th}$ pixel row PXRm. The fourth cut region C4 may be disposed on the $m^{th}$ pixel row PXRm, and may be formed on the second line segment L2 located between the third emission region LA3 of the $(n-1)^{th}$ pixel column PXCn-1 and the second emission region LA2 of the $n^{th}$ pixel column PXCn.

The fifth cut region C5 may be disposed on the (n+1)th pixel column PXCn+1, and may be formed on the second line segment L2 located between the second emission region LA2 of the (m-1)th pixel row PXRm-1 and the third emission region LA3 of the (m-1)th pixel row PXRm-1. The sixth cut region C6 may be disposed on the (n+1)th pixel column PXCn+1, and may be formed on the second line segment L2 located between the second emission region LA2 of the (m-1)th pixel row PXRm-1 and the first emission region LA1 of the $m^{th}$ pixel row PXRm. The seventh cut region C7 may be disposed on the $m^{th}$ pixel row PXRm, and may be formed on the second line segment L2 located between the third emission region LA3 of the $n^{th}$ pixel column PXCn and the second emission region LA2 of the $(n+1)^{th}$ pixel column PXCn+1. The eighth cut region C8 may be disposed on the $(n+1)^{th}$ pixel column PXCn+1, and may be formed on the first line segment L1 located between the second emission region LA2 of the $m^{th}$ pixel row PXRm and the first emission region LA1 of the $(m+1)^{th}$ pixel row PXRm+1.

The first cut region C1, the third cut region C3, the sixth cut region C6, and the eighth cut region C8 may be formed on the first line segment L1, and may connect the first opening region EOP1 to the second opening region EOP2. The second cut region C2, the fourth cut region C4, the fifth cut region C5, and the seventh cut region C7 may be formed on the second line segment L2, and may connect the second opening region EOP2 and the third opening region EOP3.

Referring to FIG. 7B, the first conductive layer 220 may include a plurality of dummy patterns MP. The plurality of dummy patterns MP may correspondingly overlap the plurality of cut regions DCA depicted in FIG. 7A. The plurality of dummy patterns MP may include first to eighth dummy patterns MP1 to MP8 that respectively correspond to the first to eighth cut regions C1 to C8.

FIGS. 7C and 7D show an enlarged illustration of the cut region DCA formed on the first line segment L1 and the cut region DCA formed on the second line segment L2. The dummy pattern MP may be disposed to correspond to the cut region DCA.

The second insulation layer 230 may be disposed between the dummy pattern MP and the cut region DCA of the first line segment L1 and between the dummy pattern MP and the cut region DCA of the second line segment L2. In some embodiments, the dummy pattern MP is disposed in a lower portion of the second insulation layer 230, but the present invention is not limited thereto.

The first line segment L1 and the second line segment L2 may each have a multi-layered stacked structure. The first line segment L1 and the second line segment L2 may have the same stacked structure. Each of the first and second line segments L1 and L2 may include a first conductive layer CL10 (e.g., a first line conductive layer), a second conductive layer CL20 (e.g., a second line conductive layer) disposed on and in contact with the first conductive layer CL10, and a third conductive layer CL30 (e.g., a third line conductive layer) disposed below and in contact with the first conductive layer CL10. In some examples, the third conductive layer CL30 may be omitted.

The first conductive layer CL10 may have a first reflectance, a first conductivity, and a first thickness. The second conductive layer CL20 may have a second reflectance less than the first reflectance, a second conductivity less than the first conductivity, and a second thickness less than the first thickness. The first conductive layer CL10 whose resistance is lower (e.g., is low) may substantially correspond to a signal transfer path. A plurality of signal lines SL1 and SL2 each having an increased thickness may be disposed on a small planar area. The second conductive layer CL20 whose reflectance is lower (e.g., is low) may cover the first conductive layer CL10, thereby reducing reflectance of external light.

A medium-sized electronic apparatus, such as tablet computers and laptop computers depicted in FIGS. 1 and 6A, may have an input sensor whose area is greater than that of an input sensor included in a small-sized electronic apparatus, such as mobile phones. As an increase in length of the first electrodes E1-1 to E1-4 and the second electrodes E2-1 to E2-7 causes an increase in resistance of the first electrodes E1-1 to E1-4 and the second electrodes E2-1 to E2-7, a low-resistance layer, such as the first conductive layer CL10, may have an increased thickness to reduce the resistance.

Compared to the first conductive layer CL10, the third conductive layer CL30 may have a large bonding force with the first insulation layer 210. The first conductive layer CL10 may include one or more of aluminum, copper, and silver each having a low resistance. The second conductive layer CL20 may include titanium. The second conductive layer CL20 may have a thickness of about 100 Å to about 500 Å. As the second conductive layer CL20, or titanium, is adopted as an uppermost conductive layer, a reflectance of external light may be reduced, and a reflected light of the titanium layer may produce a relatively small color shift. The third conductive layer CL30 may include zinc indium oxide (ZIO), indium oxide (InO), zinc oxide (ZnO), metal included in the first conductive layer CL10, or an alloy of the metal included in the first conductive layer CL10.

The dummy pattern MP may have optical properties substantially the same as those of the first line segment L1 and the second line segment L2. For example, the dummy pattern MP may have a reflection substantially the same as that of the first line segment L1 and the second line segment L2. The dummy pattern MP may have a material substantially the same as that of the first line segment L1 and the second line segment L2.

The dummy pattern MP may have a stacked structure that is the same as that of the first line segment L1 and the second line segment L2. The dummy pattern MP and the first line segment L1 may have the same stacked structure. As the dummy pattern MP is disposed to compensate the cut region DCA in terms of optical properties, it may be preferable that the first line segment L1 and the second line segment L2 have the same stacked structure.

A first conductive layer CL1 (e.g., a first line conductive layer) of the dummy pattern MP may have the same or substantially the same material and thickness as those of the first conductive layer CL10 of the first line segment L1. A second conductive layer CL2 (e.g., a second line conductive layer) of the dummy pattern MP may have the same or substantially the same material and thickness as those of the second conductive layer CL20 of the first line segment L1. A third conductive layer CL3 (e.g., a third line conductive layer) of the dummy pattern MP may have the same or substantially the same material and thickness as those of the third conductive layer CL30 of the first line segment L1.

FIG. 7E depicts a reflection path of external light. Substantially, the external light may be reflected from a lateral surface of the second conductive layer CL20 discussed in FIG. 7D. When the dummy pattern MP is absent, the external light might not be reflected on the cut region DCA and thus the cut region DCA may be visible. When the dummy pattern MP is disposed corresponding to the cut region DCA, the external light may be reflected from the dummy pattern MP to correspond to the cut region DCA. Accordingly, the cut region DCA may be less visible.

Figure 8A:
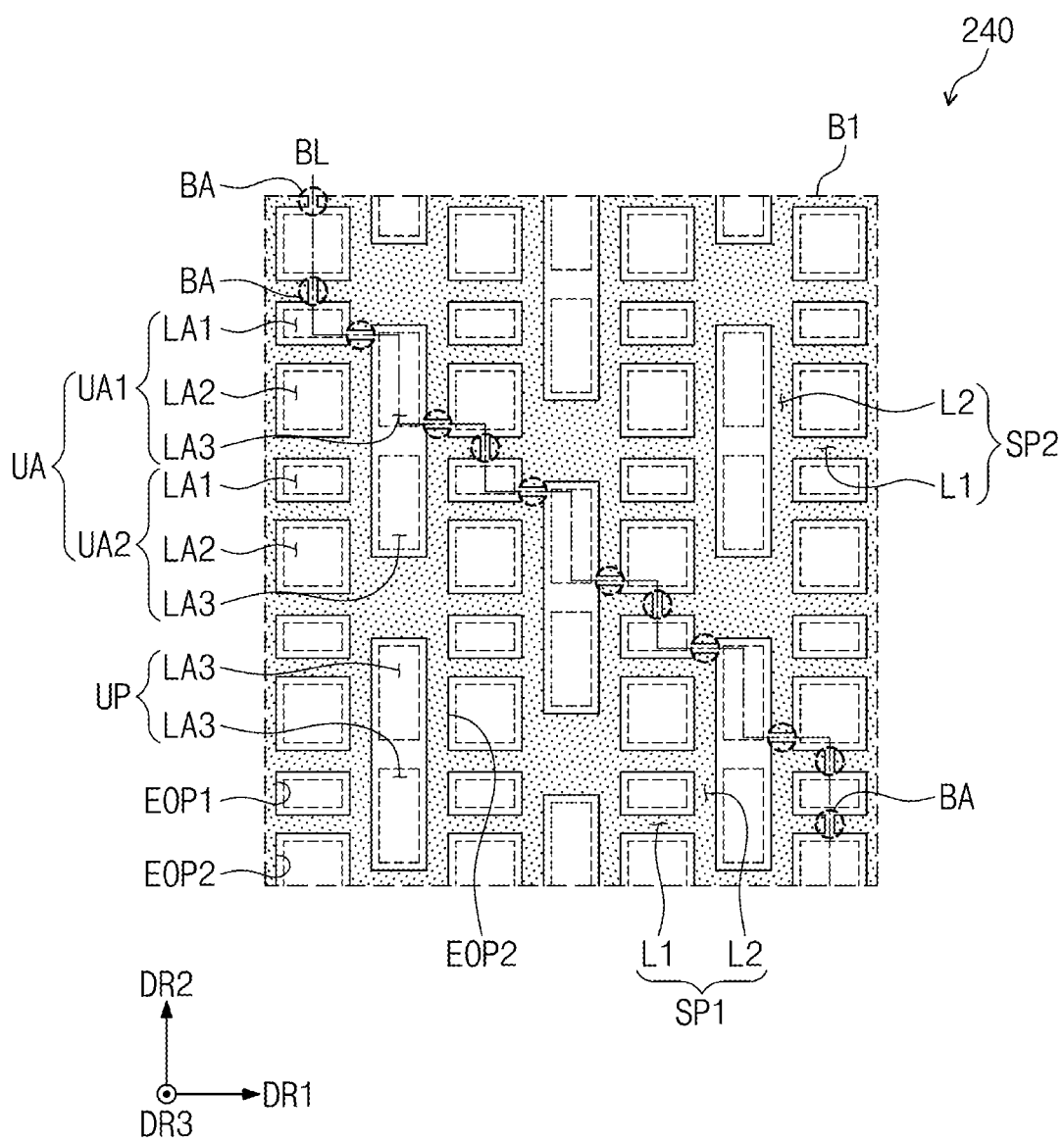
FIG. 8A is an enlarged plan view showing a second conductive layer that corresponds to a second region of FIG. 6A, according to some embodiments of the present invention.
Figure 8B:
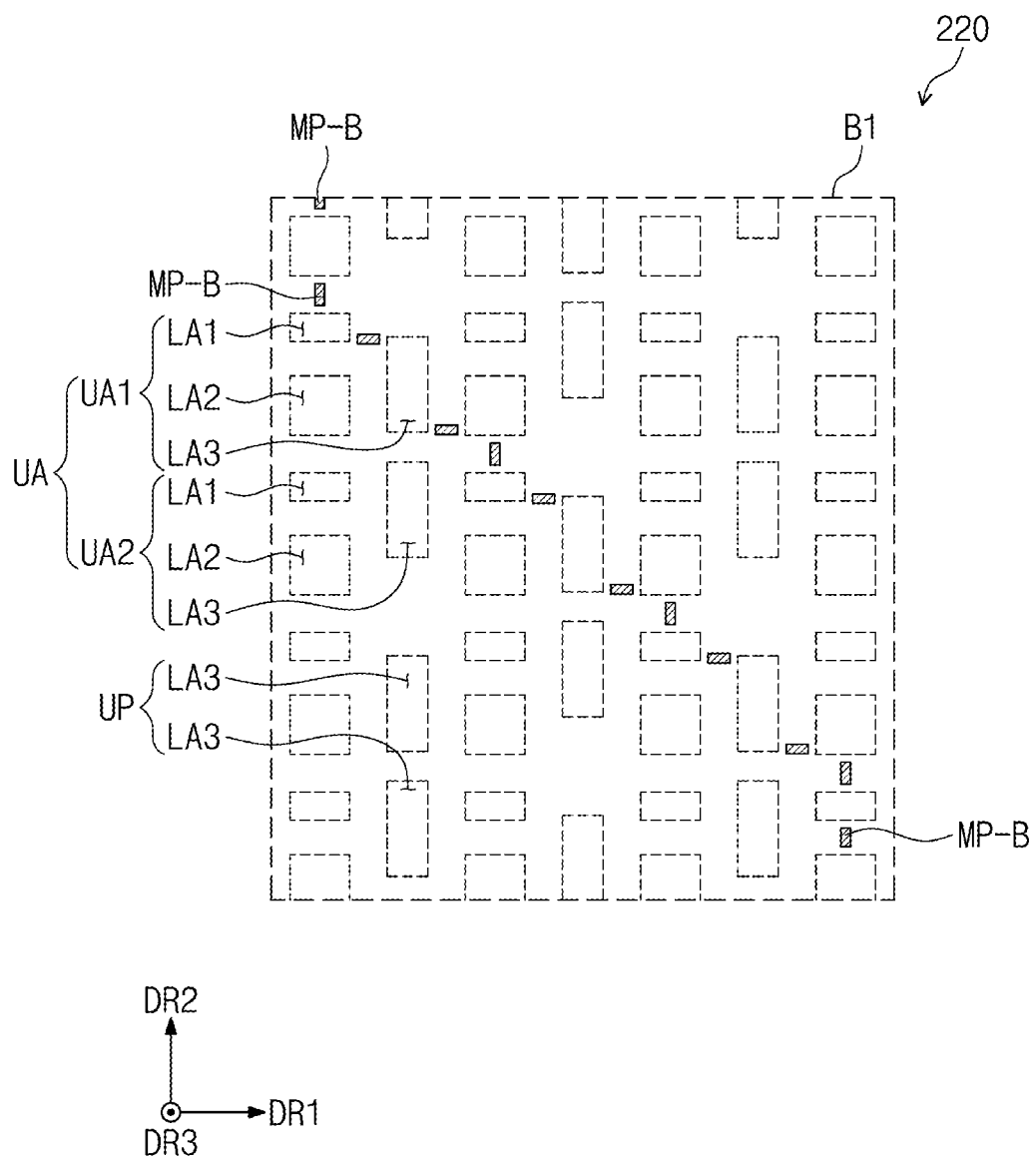
FIG. 8B is an enlarged plan view showing a first conductive layer that corresponds to a second region of FIG. 6A, according to some embodiments of the present invention.

FIG. 8A is an enlarged plan view showing the second conductive layer 240 that corresponds to a second region B1 of FIG. 6A, according to some embodiments of the present invention. FIG. 8B is an enlarged plan view showing the first conductive layer 220 that corresponds to a second region B1 of FIG. 6A, according to some embodiments of the present invention.

FIG. 8A depicts a boundary region between the sensing pattern SP1 of a third first electrode E1-3 and the sensing part SP2 of a fifth second electrode E2-5. As the first and second line segments L1 and L2 are removed in accordance with a particular pattern (e.g., a certain rule), a boundary region may be defined between the first electrode E1-3 and the second electrode E2-5 or boundary regions BA may be defined between the first and second line segments L1 and L2 of the sensing pattern SP1 and the first and second line segments L1 and L2 of the sensing part SP2.

In FIG. 8A. an imaginary boundary line BL is depicted to clearly express a boundary region between the first electrode E1-3 and the second electrode E2-5. The boundary region between the first electrode E1-3 and the second electrode E2-5 may be defined to indicate a set of the boundary regions BA between the first and second line segments L1 and L2 of the sensing pattern SP1 and the first and second line segments L1 and L2 of the sensing part SP2. FIG. 8A depicts by way of example twelve boundary regions BA.

One of the boundary regions BA may be positioned between the first opening region EOP1 and the second opening region EOP2, another of the boundary regions BA may be positioned between the first opening region EOP1 and the third opening region EOP3, and still another of the boundary regions BA may be positioned between the third opening region EOP3 and the second opening region EOP2. One of the boundary regions BA may be defined on the first line segment L1 or the second line segment L2 positioned on each of the first unit emission region UA1 and the second unit emission region UA2. Another of the boundary regions BA may be defined on the first line segment L1 or the second line segment L2 positioned between the first unit emission region UA1 and the second unit emission region UA2 disposed on different pixel rows or different pixel columns.

Referring to FIG. 8B, the first conductive layer 220 may include a plurality of dummy patterns MP-B disposed on the boundary region between the first electrode E1-3 and the second electrode E2-5. Although the plurality of dummy patterns MP-B are allocated a different symbol from that of the plurality of dummy patterns MP depicted in FIG. 7B, the plurality of dummy patterns MP-B may be substantially the same as the plurality of dummy patterns MP depicted in FIG. 7B. The plurality of dummy patterns MP depicted in FIG. 7B and the plurality of dummy patterns MP-B depicted in FIG. 8B may be formed in the same process, may have the same structure, and may include the same or substantially the same material.

The plurality of dummy patterns MP-B may correspondingly overlap the plurality of boundary regions BA. The plurality of dummy patterns MP-B disposed on the plurality of boundary regions BA may have their functions substantially the same as those of the plurality of dummy patterns MP discussed with reference to FIGS. 7A to 7E.

The presence of the plurality of dummy patterns MP-B may reduce visibility of the boundary region between the first electrode E1-3 and the second electrode E2-5. Visibility Level 3 may be defined to indicate a state in which the presence of the plurality of dummy patterns MP-B reduces visibility of the boundary region between the first electrode E1-3 and the second electrode E2-5. Visibility Level 4 may be defined to indicate a state in which the plurality of boundary regions BA are substantially replaced with the plurality of dummy patterns MP-B not to substantially recognize the boundary region between the first electrode E1-3 and the second electrode E2-5. The plurality of dummy patterns MP-B may cause an optical compensation difference between Visibility Level 3 and Visibility Level 4.

The presence of the plurality of dummy patterns MP-B may reduce a reflectance difference between the second line segment L2 and the cut region DCA discussed with reference to FIG. 7C. The reflectance difference may be defined as Visibility Level 3. Visibility Level 4 may be defined to indicate a state where the reflectance difference is in a range of about −5% to about +5% or from −10% to about +10%. For example, the reflectance difference may be remarkably less in Visibility Level 4 compared to that in Visibility Level 3.

For ease of illustration, in FIG. 8A, the cut regions DCA of the sensing pattern SP1 and the sensing part SP2 are not illustrated to accentuate the boundary regions BA. However, in some embodiments, the cut regions DCA in accordance with the pattern/rule discussed with reference to FIG. 7A is defined on the first electrodes (see E1-1 to E1-4 of FIG. 6A) and the second electrodes (see E2-1 to E2-7 of FIG. 6A). In addition, the dummy pattern MP is not illustrated in FIG. 8B, the dummy patterns MP may further be disposed to correspond to the cut regions DCA in accordance with the rule discussed with reference to FIG. 7A. The cut regions DCA and the dummy pattern MP may provide Visibility Level 3 or Visibility Level 4 even in an inner region of the first electrode E1-3 and the second electrode E2-5.

In some embodiments of the present invention, the cut regions DCA are not defined on the first electrode E1-3 and the second electrode E2-5. As discussed above, the cut regions DCA may be formed to reduce Visibility Level 1 into Visibility Level 2. However, when it is possible to secure Visibility Level 4 where the boundary region between the first electrode E1-3 and the second electrode E2-5 is not substantially visible, it might not matter even if the cut regions DCA are not formed on the first electrode E1-3 and the second electrode E2-5. When the cut regions DCA are not formed on the first electrode E1-3 and the second electrode E2-5, the first electrode E1-3 and the second electrode E2-5 may have their reduced resistances to increase sensitivity.

Figure 9A:
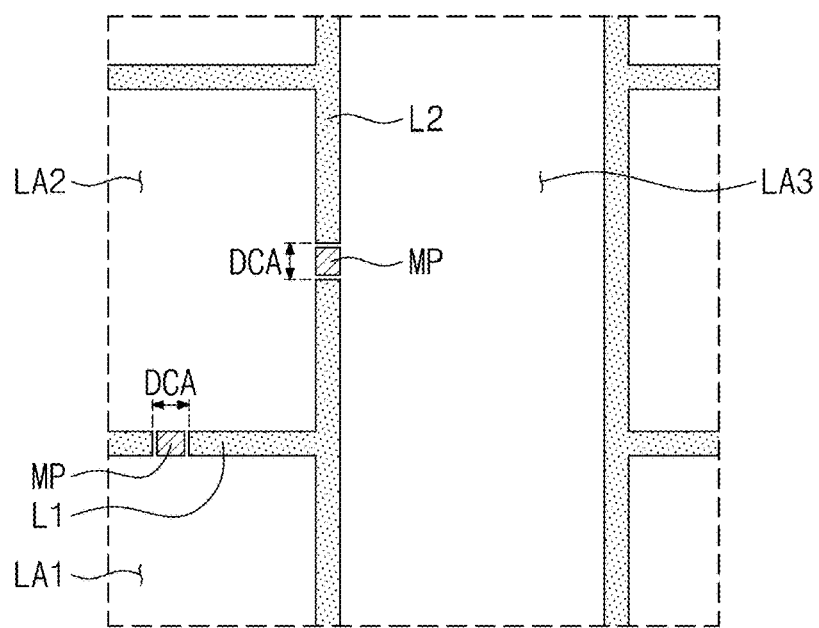
FIGS. 9A to 9C is an enlarged plan view partially showing a first region of an input sensor according to some embodiments of the present invention.
Figure 9B:
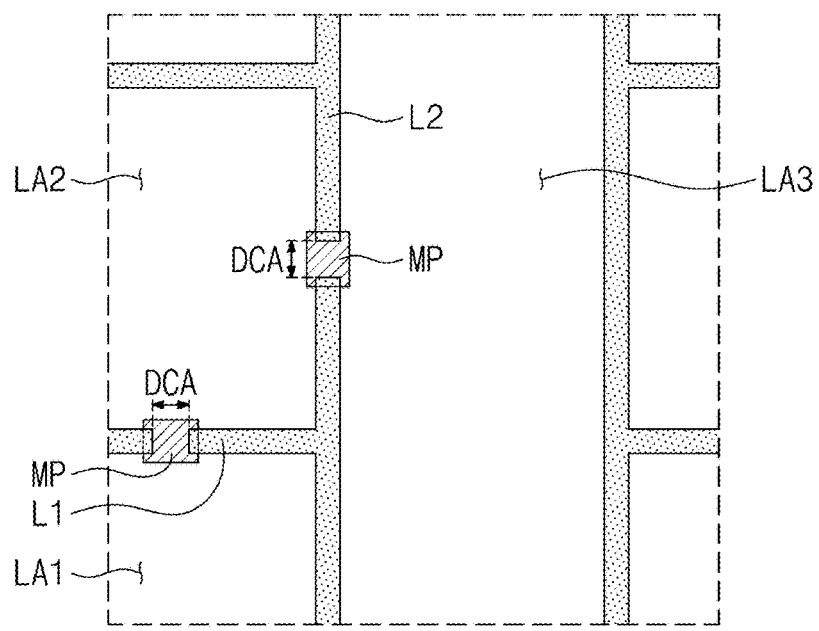
Figure 9C:
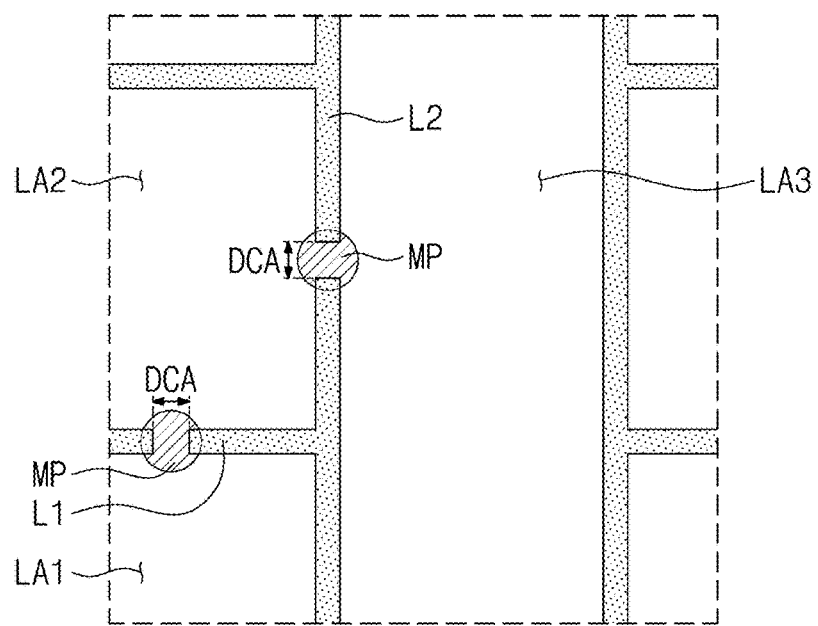
Figure 9D:
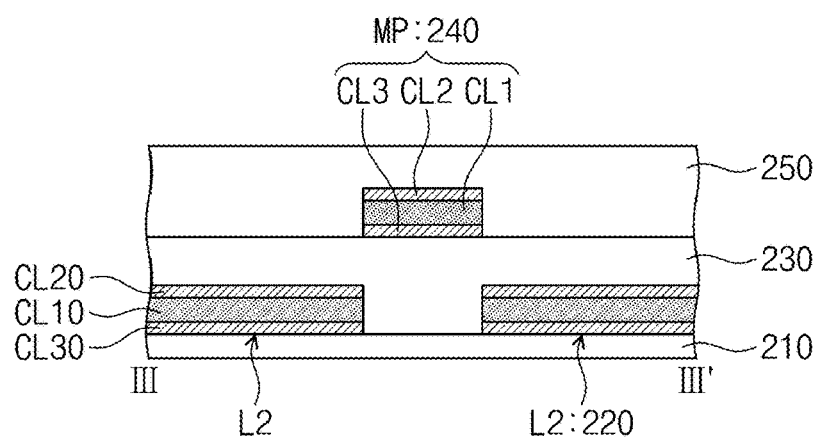
FIG. 9D is a cross-sectional view showing an input sensor according to some embodiments of the present invention.

FIGS. 9A to 9C is an enlarged plan view partially showing a first region A1 of the input sensor 200 according to some embodiments of the present invention. FIG. 9D is a cross-sectional view showing the input sensor 200 according to some embodiments of the present invention. FIGS. 9A to 9C may correspond to FIG. 7C, and FIG. 9D may correspond to FIG. 7D. In the embodiments that follow, the description of FIGS. 7A to 7C will be true of components that are the same as those discussed with reference to FIGS. 7A to 7C.

As shown in FIGS. 9A to 9C, the dummy patterns MP may have various suitable areas and shapes. The area and shape of the dummy patterns MP may be set to conform to reflection properties of the dummy patterns MP.

As illustrated in FIG. 9A, the dummy pattern MP may have an area less than that of the cut region DCA, and may have a line-width that is the same as that of the cut region DCA. As illustrated in FIG. 9B, the dummy pattern MP may have an area greater than that of the cut region DCA, and may have a length and a line-width that is greater than as those of the cut region DCA. As illustrated in FIG. 9C, the dummy pattern MP may have a shape different from that of the cut region DCA. The dummy pattern MP may have a circular shape. The shape of the dummy pattern MP is not particularly limited thereto, and may have an oval shape or any other suitable shape.

As illustrated in FIG. 9D, the dummy pattern MP may be disposed on the second insulation layer 230, and the second line segment L2 may be disposed below the second insulation layer 230. In such examples, the second conductive layer 240 may be formed into the bridge patterns CP1 discussed with reference to FIGS. 6A and 6B.

According to the present invention, dummy patterns may increase an amount of reflection of external light on cut regions or boundary regions. The dummy patterns may reduce a difference between an amount of reflection of external light on an area where line segments are disposed and an amount of reflection of external light on an area that corresponds to the cut regions or the boundary regions. Therefore, an input sensor may have reduced visibility.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," "comprising," "has," "have," and "having," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For example, the expression "A and/or B" denotes A, B, or A and B. Expressions such as "one or more of" and "at least one of," when preceding a list of elements, modify the entire list of elements and do not modify the individual elements of the list. For example, the expression "one or more of A, B, and C," "at least one of A, B, or C," "at least one of A, B, and C," and "at least one selected from the group consisting of A, B, and C" indicates only A, only B, only C, both A and B, both A and C, both B and C, or all of A, B, and C.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", "in contact with", "in direct contact with", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

When one or more embodiments may be implemented differently, a specific process order may be performed differently from the described order. For example, (i) the disclosed operations of a process are merely examples, and may involve various additional operations not explicitly covered, and (ii) the temporal order of the operations may be varied.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification.

Although some embodiments have been described with reference to a number of illustrative examples thereof, it will be understood by those of ordinary skill in the art that various changes in form and details may be made without departing from the spirit and scope of the present invention as set forth in the following claims and equivalents thereof. Thus, the technical scope of the present invention is not limited by the embodiments and examples described above, but by the following claims and equivalents thereof.

What is claimed is:

1. A display device comprising:
    a display panel comprising a plurality of emission regions and a non-emission region adjacent to the plurality of emission regions; and
    an input sensor on the display panel, the input sensor comprising:
        an insulation layer;
        a first sensing electrode;
        a second sensing electrode comprising a sensing pattern spaced from the first sensing electrode in a plan view; and
        a plurality of dummy patterns spaced from the first sensing electrode and the sensing pattern of the second sensing electrode,
    wherein the insulation layer is between the first sensing electrode and the plurality of dummy patterns and is between the second sensing electrode and the plurality of dummy patterns,
    wherein each of the first sensing electrode and the sensing pattern of the second sensing electrode comprises a plurality of line segments that overlap the non-emission region, the line segments defining a plurality of opening regions that overlap corresponding emission regions of the plurality of emission regions, and
    wherein some of the dummy patterns are under and overlap boundary regions defined by spacing regions between the line segments of the first sensing electrode and the line segments of the sensing pattern of the second sensing electrode.

2. The display device of claim 1, wherein the line segments of the first sensing electrode and the line segments of the sensing pattern of the second sensing electrode define a plurality of cut regions, and
    wherein each of the dummy patterns is under and overlaps a corresponding one of the cut regions and the boundary regions.

3. The display device of claim 2, wherein the emission regions comprise:
    a plurality of first emission regions configured to emit light of a first color;
    a plurality of second emission regions configured to emit light of a second color; and
    a plurality of third emission regions configured to emit light of a third color,
    wherein two first emission regions of the first emission regions, two second emission regions of the second emission regions, and two third emission regions of the third emission regions define a unit emission region, and
    wherein the unit emission region comprises:
        a first unit emission region where one of the two first emission regions and one of the two second emission regions are on one side of one of the two third emission regions, and where the third emission region is positioned downwardly with respect to the one of the two first emission regions and the one of the two second emission regions in a direction along which the two first emission regions and the two second emission regions are arranged; and a second unit emission region where another of the two first emission regions and another of the two second emission regions are on one side of another of the two third emission regions, and where the another of the two third emission regions is positioned upwardly with respect to the another of the two first emission regions and the another of the two second emission regions in the direction along which the two first emission regions and the two second emission regions are arranged.

4. The display device of claim 3, wherein the plurality of opening regions comprise:
a first opening region corresponding to one of the first emission regions;
a second opening region corresponding to one of the second emission regions; and
a third opening region corresponding in common to the one of the two third emission regions of the first unit emission region and the another of the two third emission regions of the second unit emission region, the two third emission regions being adjacent to each other in the direction along which the two first emission regions and the two second emission regions are arranged.

5. The display device of claim 4, wherein one of the boundary regions is between one of the two first emission regions and one of the two second emission regions,
wherein another of the boundary regions is between one of the two first emission regions and one of the two third emission regions, and
wherein still another of the boundary regions is between one of the two second emission regions and one of the two third emission regions.

6. The display device of claim 4, wherein one of the cut regions is between one of the two first emission regions and one of the two second emission regions, and
wherein still another of the cut regions is between one of the two second emission regions and one of the two third emission regions.

7. The display device of claim 4, wherein the first emission regions, the second emission regions, and the third emission regions define a plurality of unit emission regions comprising the unit emission region,
wherein the plurality of unit emission regions define a pixel matrix that comprises an $(m-1)^{th}$ pixel row, an $m^{th}$ pixel row, an $(m+1)^{th}$ pixel row, an $(n-1)^{th}$ pixel column, an $n^{th}$ pixel column, and an $(n+1)^{th}$ pixel column, where each of m and n is a natural number equal to or greater than 2,
wherein the first unit emission region is on each of an intersection between the $(m-1)^{th}$ pixel row and the $(n-1)^{th}$ pixel column, an intersection between the $(m+1)^{th}$ pixel row and the $(n-1)^{th}$ pixel column, an intersection between the $m^{th}$ pixel row and the $n^{th}$ pixel column, an intersection between the $(m-1)^{th}$ pixel row and the $(n+1)^{th}$ pixel column, and an intersection between the $(m+1)^{th}$ pixel row and the $(n+1)^{th}$ pixel column, and
wherein the second unit emission region is on each of an intersection between the $m^{th}$ pixel row and the $(n-1)^{th}$ pixel column, an intersection between the $(m-1)^{th}$ pixel row and the $n^{th}$ pixel column, an intersection between the $(m+1)^{th}$ pixel row and the $n^{th}$ pixel column, and an intersection between the $m^{th}$ pixel row and the $(n+1)^{th}$ pixel column.

8. The display device of claim 7,
wherein the line segments comprise:
a first line segment extending in a first direction; and
a second line segment extending in a second direction intersecting the first direction,
wherein the cut regions define a plurality of cut units each of which comprise first to eighth cut regions,
wherein the first cut region is defined on the first line segment between the first and second emission regions of the second unit emission region at the intersection between the $(m-1)^{th}$ pixel row and the $n^{th}$ pixel column,
wherein the second cut region is defined on the second line segment between the second and third emission regions of the second unit emission region at the intersection between the $(m-1)^{th}$ pixel row and the $n^{th}$ pixel column,
wherein the third cut region is defined on the first line segment between the first and second emission regions of the first unit emission region at the intersection between the $m^{th}$ pixel row and the $n^{th}$ pixel column, and
wherein the fourth cut region is defined on the second line segment between the third emission region of the second unit emission region at the intersection between the $m^{th}$ pixel row and the $(n-1)^{th}$ pixel column and the second emission region of the first unit emission region at the intersection between the $m^{th}$ pixel row and the $n^{th}$ pixel column.

9. The display device of claim 8,
wherein the fifth cut region is defined on the second line segment between the second and third emission regions of the first unit emission region at the intersection between the $(m-1)^{th}$ pixel row and the $(n+1)^{th}$ pixel column,
wherein the sixth cut region is defined on the first line segment between the second emission region of the first unit emission region at the intersection between the $(m-1)^{th}$ pixel row and the $(n+1)^{th}$ pixel column and the first emission region of the second unit emission region at the intersection between the $m^{th}$ pixel row and the $(n+1)^{th}$ pixel column,
wherein the seventh cut region is defined on the second line segment between the third emission region of the first unit emission region at the intersection between the $m^{th}$ pixel row and the $n^{th}$ pixel column and the second emission region of the second unit emission region at the intersection between the $m^{th}$ pixel row and the $(n+1)^{th}$ pixel column, and
wherein the eighth cut region is defined on the first line segment between the one of the two second emission regions of the second unit emission region at the intersection between the $m^{th}$ pixel row and the $(n+1)^{th}$ pixel column and the one of the two first emission regions of the first unit emission region at the intersection between the $(m+1)^{th}$ pixel row and the $(n+1)^{th}$ pixel column.

10. The display device of claim 7,
wherein the line segments comprise:
a first line segment extending in a first direction; and
a second line segment extending in a second direction intersecting the first direction,
wherein the cut regions define a plurality of cut units each of which comprises first to eighth cut regions,
wherein the first to eighth cut regions are divided into four pairs, each of which comprises two cut regions that are closest to each other among the first to eighth cut regions,
wherein one of the two cut regions of each of the four pairs is defined on the first line segment, and wherein an other of the two cut regions of each of the four pairs is defined on the second line segment.

11. The display device of claim 1, wherein the line segments and the dummy patterns have a same stacked structure.

12. The display device of claim 11, wherein the line segments and the dummy patterns comprise a first conductive layer and a second conductive layer on the first conductive layer, and
wherein the first conductive layer has an electrical conductivity and a reflectance greater than an electrical conductivity and a reflectance of the second conductive layer.

13. The display device of claim 1,
wherein the second sensing electrode comprises a plurality of sensing patterns comprising the sensing pattern, plurality of sensing patterns are arranged along a first direction,
wherein the second sensing electrode further comprises bridge patterns each of which connects two neighboring sensing patterns of the plurality of sensing patterns, and
wherein the bridge patterns and the dummy patterns are on the same layer.

14. The display device of claim 13, wherein the bridge patterns and the dummy patterns comprise the same stacked structure.

15. The display device of claim 14, wherein the first sensing electrode extends in a second direction and has a single unitary shape, the second direction intersecting the first direction.

16. A display device comprising:
a display panel that comprises a plurality of emission regions and a non-emission region adjacent to the plurality of emission regions; and
an input sensor on the display panel, the input sensor comprising:
an insulation layer;
a sensing electrode; and
a plurality of dummy patterns between the sensing electrode and the insulation layer,
wherein the sensing electrode comprises a plurality of line segments that overlap the non-emission region, the line segments defining a plurality of opening regions that overlap corresponding emission regions of the plurality of emission regions,
wherein a plurality of cut regions are defined on the line segments, and
wherein the dummy patterns are under and overlap the cut regions.

17. The display device of claim 16,
wherein the line segments comprise:
a first line segment extending in a first direction; and
a second line segment extending in a second direction intersecting the first direction,
wherein the cut regions are divided into a plurality of cut region pairs each comprising two cut regions that are most adjacent to each other,
wherein one of the two cut regions of each of the plurality of cut region pairs is defined on the first line segment, and
wherein an other of the two cut regions of each of the plurality of cut region pairs is defined on the second line segment.

18. The display device of claim 16, wherein the line segments and the dummy patterns comprise a first conductive layer and a second conductive layer on the first conductive layer, and
wherein the first conductive layer has an electrical conductivity and a reflectance greater than an electrical conductivity and a reflectance of the second conductive layer.

19. The display device of claim 16, wherein the line segments and the dummy patterns have substantially the same reflectance.

20. The display device of claim 16, wherein the line segments and the dummy patterns comprise substantially the same material.

* * * * *